United States Patent [19]

Utsumi et al.

[11] Patent Number: 5,492,783
[45] Date of Patent: Feb. 20, 1996

[54] ELECTROSTATIC INFORMATION-RECORDING MEDIA AND PROCESS FOR RECORDING AND REPRODUCING ELECTROSTATIC INFORMATION

[75] Inventors: Minoru Utsumi; Hiroyuki Obata; Seiji Take; Masayuki Iijima; Hironori Kamiyama, all of Tokyo, Japan

[73] Assignee: Dai Nippon Printing Co., Ltd., Tokyo, Japan

[21] Appl. No.: 126,523

[22] Filed: Sep. 24, 1993

Related U.S. Application Data

[63] Continuation-in-part of Ser. No. 720,863, filed as PCT/JP90/01496, Nov. 16, 1990, abandoned.

[30] Foreign Application Priority Data

| Nov. 17, 1989 | [JP] | Japan | 1-299165 |
| Nov. 17, 1989 | [JP] | Japan | 1-299166 |
| Mar. 12, 1990 | [JP] | Japan | 2-60374 |
| Jul. 16, 1990 | [JP] | Japan | 2-187546 |

[51] Int. Cl.$^6$ ............................................. G03G 13/18
[52] U.S. Cl. ................................................. 430/48; 430/55
[58] Field of Search ........................... 430/48, 40, 41, 430/55

[56] References Cited

U.S. PATENT DOCUMENTS

| 3,063,872 | 11/1962 | Boldebuck | 430/50 |
| 3,113,022 | 12/1963 | Cassiers et al. | 430/50 |
| 3,333,958 | 8/1967 | Giaimo, Jr. | 430/50 |
| 3,443,937 | 5/1969 | Ewing | 430/50 |
| 5,161,233 | 11/1992 | Matsuo et al. | 430/48 |

FOREIGN PATENT DOCUMENTS

| 49-22135 | 2/1974 | Japan . |
| 49-10703 | 3/1974 | Japan . |
| 52-142841 | 10/1977 | Japan . |
| 56-113186 | 9/1981 | Japan . |
| 58-136036 | 8/1983 | Japan . |
| 58-154847 | 9/1983 | Japan . |
| 61-36752 | 2/1986 | Japan . |
| 61-122683 | 6/1986 | Japan . |
| 1296255 | 11/1989 | Japan . |

*Primary Examiner*—John Goodrow
*Attorney, Agent, or Firm*—Dellett and Walters

[57] ABSTRACT

The present invention provides an electrostatic information-recording medium including an electrode layer (13) and a charge-retaining layer, in which said charge-retaining layer is formed of a laminate of a resin layer (11a) having a low glass transition temperature with a heat-resistant, insulating layer (11b), or an electrostatic information-recording medium comprising at least an electrode layer (13) and a charge-retaining layer (11) in which said charge-retaining layer (11) is formed of a polymer layer (12) containing pentafluorostyrene as a monomer component and having a weight-average molecular weight of 10,000 to 2,000,000, or which includes a photoconductive layer (44) and a charge-retaining layer (43) between a pair of electrodes (42) and (45) and is designed to carry out exposure with the application of voltage between both said electrodes (42) and (45) or apply voltage between both said electrodes (42) and (45) while exposure is carried out, thereby forming an electrostatic latent image, which is then carried on said charge-retaining layer (43) by releasing said charge-retaining layer (43) from said electrode 42, or which includes a charge transport layer (51) on an electrode (52) and is designed to record information on the surface of said charge transport layer (51) by toner development and then apply electrostatic charges on the surface of said charge transport layer (51) to inject said electrostatic charges into said charge transport layer through an electrically conductive layer of the toner, thereby forming electrostatic information corresponding to the toner information on said charge transport layer. Thus, the electrostatic information-recording medium can thus be improved in terms of the capability to retain electrostatic information. The electrostatic information retained in this electrostatic information-recording medium is very stable because of being accumulated in the charge-carrying layer. Also, the information can be easily reproduced in the form of information of high quality and resolution by detecting a potential difference between the electrode and the surface potential.

4 Claims, 9 Drawing Sheets

ELECTROSTATIC INFORMATION-RECORDING MEDIA AND PROCESS FOR RECORDING AND REPRODUCING ELECTROSTATIC INFORMATION

"This is a continuation-in-part of application(s) Ser. No. 07/720,863 filed on Jul. 16, 1991, now abandoned, International Application PCT/JP90/01/496 filed on Nov. 16, 1990 and which designated the U.S."

TECHNICAL FIELD

The present invention relates to an electrostatic information-recording medium which can electrostatically record information by an exposure process with the application of voltage or other processes and reproduce the information at any desired time. More particularly, this invention is directed to an electrostatic information-recording medium which is improved in terms of the capability to carry electrostatic information and a process for recording and reproducing the electrostatic information.

BACKGROUND TECHNIQUE

In electrophotography or other techniques so far known in the art, a photoconductive layer is vapor deposited on an electrode layer. After the photoconductive layer is electrically charged all over the surface, "image exposure" is carried out to cause some charges to leak out of the exposed region, thereby forming optically an electrostatic latent image thereon. A toner opposite in polarity to the residual charges is then deposited on the latent image, which is in turn electrostatically transferred onto paper, etc. for development. According to these techniques which are mainly used for copying, the period of carrying electrostatic charges in the photoconductive layer serving as a recording medium is so reduced that toner development must be conducted just after the formation of the electrostatic latent image. Thus, they can never be used for, e.g. photographing because of their low sensitivity.

With TV photographing techniques, it is required to extract electrical image signals obtained in a pick-up tube and subjecting the resulting image to sequential line scanning for recording. Sequential line scanning is conducted with electron beams in the pick-up tube and with a magnetic head in the case of video recording. However, a problem with these techniques is that the resolution, depending upon the number of scanning lines, is much lower than that achieved with planar analog recording such as silver photography.

This is also essentially true of recently developed TV image pickup systems making use of solid-state image sensors. A problem associated with these techniques are that the higher the quality and resolution of image recording, the more complicated the processing steps involved, or the more simplified the processing steps, the more likely it is that some memory function is lost or the quality of images degrades seriously.

This invention has for its object to improve the capability of an electrostatic information-recording medium to carry electrostatic information, and seeks to provide an electrostatic information-recording medium improved in terms of the capability to carry electrostatic information and a process for recording and reproducing electrostatic information with such a recording medium.

DISCLOSURE OF THE INVENTION

According to the first aspect of this invention, there is provided an electrostatic information-recording medium including an electrode layer and a charge-retaining layer, characterized in that said charge-retaining layer comprises a laminate of a resin layer having a low glass transition temperature with a heat-resistant, insulating layer.

A process for recording and reproducing electrostatic information according to the first aspect of this invention is characterized by using an electrostatic information-recording medium as such, said recording medium including an electrode layer and a charge-retaining layer, said charge-retaining layer comprising a laminate of a resin layer having a low glass transition temperature with a heat-resistant, insulating layer, and (1) recording the information in said recording medium as such, or (2) recording the information in said recording medium while said recording medium is heated at a temperature higher than said glass transition temperature of said resin layer having a low glass transition temperature, or (3) recording the information in said recording medium and, then, heating said recording medium at a temperature higher than the glass transition temperature of said resin layer having a low glass transition temperature.

According to the first aspect of the invention, there is also provided a process for recording and reproducing electrostatic information with the first electrostatic information-recording medium, characterized by:

locating a photosensitive member including a photosensitive layer on at least an electrode layer in opposite relation to the first recording medium, and (1) forming an electrostatic charge pattern in said recording medium by exposing said recording medium to light with the application of voltage between both the electrodes or applying voltage between both the electrodes while said recording medium is exposed to light, or (2) recording the information in said recording medium while said recording medium is heated at a temperature higher than the glass transition temperature of said resin layer having a low glass transition temperature, or (3) recording the information in said recording medium and, then, heating said recording medium at a temperature higher than the glass transition temperature of said resin layer having a low glass transition temperature.

In general, a high-molecular or polymer material has its own glass transition temperature. At a region lower than the glass transition point, one segment of its molecular chain is considered not to move as a whole due to its limited heat energy. At a region higher than the glass transition point, its heat energy considered to be so increased that several or more atoms forming its molecular chain can move as a whole, imparting electrical conductivity to it.

As illustrated in FIGS. 1a–b or 2a–b, the first electrostatic information-recording medium according to this invention is of the structure in which a resin layer having a low glass transition temperature and a heat-resistant, insulating layer are laminated on an electrode. After charge information are recorded on the surface of the recording medium, it is heated at a temperature higher than the glass transition temperature of the resin having a low glass transition temperature, whereby the charge information are allowed to migrate through the resin layer having a low glass transition temperature, so that the charge information can be stabilized in the recording medium.

Although the reason why the charge information are stabilized in the recording medium has yet to be clarified, it is presumed that in the case of the recording medium shown in FIGS. 1a–b, the surface charges are heated and apparently attracted into the resin layer having a low glass transition temperature under the action of an electric field defined by the surface charges and charges induced thereby on the electrode, as diagrammatically illustrated in FIG. 4a, causing a drop of the surface potential observed. In the case of the recording medium shown in FIGS. 2a–b, it is presumed that as diagrammatically shown in FIG. 4b, the opposite charges induced by the surface charges on the electrode are similarly attracted into the resin layer having a low glass transition temperature and carried in the vicinity of the interface between it and the heat-resistant resin layer.

As to how the quantity of effective charges changes by heating, where they are present, etc., there is left much to be clarified. However, a drop by heating of the surface potential found may probably be caused by a capacity change due to the apparent migration of the effective charges. Accordingly, the heat-resistant resin layer is required to be formed of a material capable of blocking charges at the heating temperature or temperatures at which the electrostatic information-recording medium is usually used. With the recording medium cooled, the charge information thus attracted into the recording medium are protected in the resin layer having a low glass transition temperature, which has resumed its insulating properties, and accumulated stably therein. Thus, it is presumed that they are not affected by atmospheric moisture, etc.

This electrostatic information-recording medium can retain electrostatic information stably, even when allowed to stand in the absence of heat. However, the accumulated electrostatic information can be instantaneously stabilized by heating the recording medium forcedly. It is noted that when the electrostatic information is gradually stabilized by allowing it to stand in the absence of heat, there is a fear that the accumulated charges may fall into disarray. However, such a fear can be eliminated by forced heating. The accumulated charges can also be retained in a stabilized state by cooling after heating.

The electrostatic information retained in this electrostatic information-recording medium are very stable because of being accumulated in the charge-retaining layer, and can be easily reproduced in the form of information of high quality and high resolution because a potential difference between the electrode and the surface potential can be easily detected.

According to the second aspect of this invention, there is provided an electrostatic information-recording medium comprising at least an electrode layer and a charge-retaining layer, characterized in that said charge-retaining layer is a pentafluorostyrene polymer layer and having a weight-average molecular weight of 10,000 to 2,000,000 (this polymer layer will be hereinafter simply referred to as the pentafluorostyrene polymer layer).

The second electrostatic information-recording medium may also be characterized in that said charge-retaining layer is obtained by the successive lamination of a fluoropolymer layer and a pentafluorostyrene polymer layer and having a weight-average molecular weight of 10,000 to 2,000,000 on said electrode layer.

According to this aspect of the invention, there is provided a process for recording and reproducing electrostatic information with the second electrostatic information-recording medium, characterized by:

locating a photosensitive member including a photoconductive layer on at least an electrode layer in opposite relation to said recording medium, and forming an electrostatic charge pattern on said recording medium by exposing said recording medium to light with the application of voltage between both the electrodes or applying voltage between both the electrodes while said recording medium is exposed to light.

According to the second aspect of this invention wherein a charge-retaining layer of an electrostatic information-recording medium is formed by the lamination of a fluoropolymer layer and a pentafluorostyrene polymer layer on an least an electrode layer, it is possible to obtain an electrostatic information-recording medium which is improved in terms of the capability to retain charges, esp., in terms of the capability of retain positive, charge information charges. High heat- and humidity-resistance that the fluoropolymer layer per se possesses also makes it possible to improve this recording medium further.

In other words, some fluoropolymer layers are less capable of retaining positive, charge information and the pentafluorostyrene layer per se is less capable of carrying charges as well. According to this aspect of the invention, however, it has been found that the capability of the recording medium to retain charges can be increased by laminating together the fluoropolymer and pentafluorostyrene polymer layers to form a charge-retaining layer.

For what reason the capability to retain charges is increased has still been unknown. However, it has been confirmed by the inventors that the pentafluorostyrene polymer layer has the pysical properties of being improved in terms of the capability of retain charges upon heated at an elevated temperature. It is presumed that such physical properties play some role in the capability of the laminate to retain charges.

The process for recording and reproducing electrostatic information according to this aspect of the invention— wherein an electrostatic latent image corresponding to an expsoure pattern is formed on the 2nd electrostatic information-recording medium by locating it in opposite relation to a photosensitive member and exposing it to light with the application of voltage between both the electrodes or applying voltage between both the electrodes while it is exposed to light—can be used for planar analog recording. According to this process wherein the electrostatic information carried in the recording medium is accumulated in electrostatic charge unit, it is possible to record the information with high quality and resolution.

According to the third aspect of the invention, there is provided an electrostatic information-recording medium including a photoconductive layer and a charge-retaining layer between a pair of electrodes, characterized in that said recording medium is exposed to light with the application of voltage between said pair of electrodes, or voltage is applied between said pair of electrodes while said recording medium is exposed to light, thereby forming an electrostatic latent image, and the associated electrode is released from said charge-retaining layer to retain said latent image on said charge-retaining layer.

According to this aspect of the invention, there is also provided a process for recording and reproducing electrostatic information with the 3rd electrostatic information-recording medium, characterized by exposing the 3rd recording medium to light with the application of voltage between both electrodes thereof, or applying voltage between both said electrodes while the 3rd recording medium is exposed to light, thereby forming an electrostatic latent image; thereafter, grounding both said electrodes; then, releasing the associated electrode from the charge-carrying layer to cause the charges on the associated electrode to remain on the charge-retaining layer through "release discharge"; and further, subjecting the charges to uniform exposure, thereby carrying an electrostatic latent image on the charge-retaining layer.

According to this electrostatic information-recording medium which is exposed to light with the application of voltage between a pair of electrodes between which a photoconductive layer and a charge-retaining layer are laminated together, it is possible not only to form an electrostatic latent image without recourse to discharge taking place through an air gap but also to achieve high-sensitive exposure, even when the voltage applied is low. Any degradation of resolution due to an air gap is avoidable.

According to the fourth aspect of the invention, there is provided an electrostatic information-recording medium including a charge transport layer on an electrode, characterized in that the electrostatic information is recorded on the surface of said charge transport layer by toner development, and electrostatic charges are thereafter applied on said surface to inject the charges applied on said toner into said charge transport layer through an electrically conductive layer of the toner, thereby forming electrostatic information corresponding to the toner information on said charge transport layer.

According to this aspect, there is also provided a process for recording and reproducing electrostatic information with the 4th electrostatic information-recording medium including a charge transport layer on an electrode, characterized by:

- locating a photosensitive member including a photoconductive layer on an electrode in opposite relation to said electrostatic information-recording medium,

- carrying out "image exposure" from said photosensitive member with the application of voltage between both said electrodes, or applying voltage between both said electrodes while "image exposure" is carried out from said photosensitive member or said recording medium, and

- separating said recording medium from said photosensitive member for toner development of charges on the surface of said recording medium thus separated, thereby forming a toner image.

According to the 4th electrostatic information-recording medium and the process for recording electrostatic information with this recording medium, an image is recorded on the surface of the charge transport layer by toner development. Thereupon, the charges formed on the toner image are injected into the charge transport layer through the an electrically conductive material of the toner, thus forming an electrostatic latent image. In other words, if information is recorded with the toner image on the charge transport layer of this recording medium, it is then possible to form an electrostatic latent image by the injection of charges, even when the toner image is all but invisible to the naked eye. This latent image can easily be developed by the toner image, or displayed on display hardware by electrical scanning.

According to this information-recording process which involves locating a photosensitive member including a photoconductive layer on an electrode in opposite relation to the 4th charge transport type of recording medium, carrying out "image exposure" from said photosensitive member or said recording medium with the application of voltage between both the electrodes, and then separating said recording medium from said photoconductive material to toner-develop the thus separated recording medium, it is possible to store the information stably over an extended period.

The electrostatic latent image is formed on the surface of the charge transport layer by exposure at a speed as fast as to a camera's shutter speed, and then toner-developed, heated and fixed to record an image. It is thus possible to record the image in an invisible amount of toner development with an increase in sensitivity. In addition, the image information can be stored by high-sensitive exposure over an extended period. Even with a toner-developed image invisible to the naked eye, it is possible to form an electrostatic latent image corresponding to the toner-developed image by electrifying the surface of the charge transport layer to inject the charges therein through the toner. This latent image can then be developed by toner development, or extracted in the form of an electrical image data by electrical reading.

BEST MODE FOR CARRYING OUT THE INVENTION

Figure 1A:
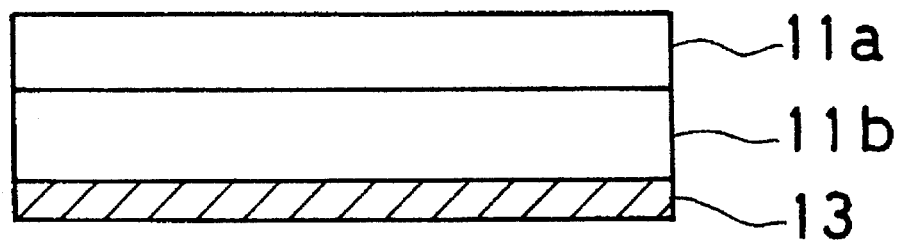
FIGS. 1a–b and 2a–b are each a sectional sketch of the electrostatic information-recording medium according to this invention.

The first electrostatic information-recording medium of this invention will now be explained.

Referring to FIGS. 1a–b and 2a–b that are the sectional sketches of the electrostatic information-recording medium of this invention, reference numeral 10 stands for an electrostatic information-recording medium, 11 a charge-retaining layer, 11a a resin layer having a low glass transition temperature, 11b a heat-resistant, non-photoconductive, insulating layer that withstands heating to the low glass temperature of the resin layer, 13 an electrode and 15 a support.

Figure 2A:
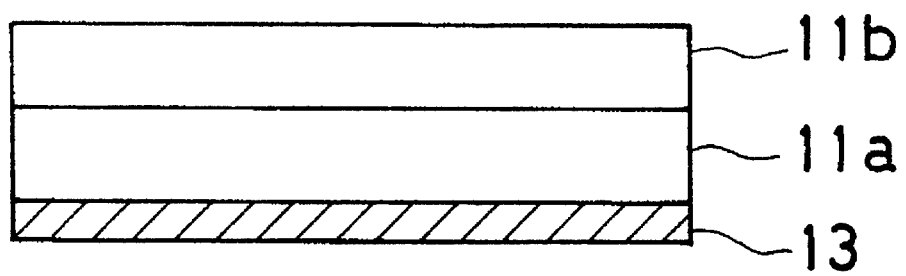

The first embodiment of the electrostatic information-recording medium of this invention is of the structure wherein the electrode 13 is laminated thereon with the heat-resistant layer 11b and the resin layer 11a having a low glass transition temperature in that order, as shown in FIG. 1a, and the second embodiment is of the structure wherein the electrode 13 is laminated thereon with the resin layer 11a having a low glass transition temperature and the heat-resistant, insulating layer 11b in that order, as illustrated in FIG. 2a.

The resin—which forms the resin layer having a low glass transition temperature in this charge-retaining layer—is required to have an insulating property of $10^{14}$ $\Omega$.cm or more as expressed in terms of specific resistance at a temperature lower than that glass transition temperature. At temperatures lower or higher than its glass transition temperature, a resin is generally known to vary in its physical properties due to a change in the motion of its molecular chains. Even when the resin is used as a material which forms a charge-retaining layer, however, the insulating property drops at temperatures higher than the glass transition temperature, so that even when charges are accumulated on it, they leak out immediately. For that reason, it is desired to use a class of resin having a glass transition temperature of 20° C. or higher in ordinary environment in which it is used.

The resins having a low glass transition temperature, for instance, may include such thermoplastic resins as polyethylene, ethylene-vinyl acetate copolymers, ethylene/ethyl acrylate-ethylene/methyl acrylate copolymers, polypropylene, polybutylene, methylpentene resin, polystyrene, poly-para-xylenes, polyvinyl acetate, polyacrylate, polymethacrylate, vinyl chloride resin, polyvinylidene chloride resin, fluoropolymers, polyacrylonitrile, polyvinyl ether, polyvinyl ketone, polyether, polycarbonate, thermoplastic polyester, polyamide, diene plastics, polyurethane plastics, petroleum resin, rosin derivatives and terpene resin; such polymers as aromatic polyamide, polyphenylene, polyxylylene, polyphenylene oxide, polysulfone and aromatic heterocyclic polymers; silicone resin and inorganic types of plastics; and naturally occurring rubber, cellulose, protein and starch types of plastics. However, preference is given to using resins having a relatively low glass transition temperature—for instance, acrylic resin, polystyrene and polyterpene.

These resins may be formed into layers as by coating or dipping of a solution of them in a suitable solvent. In accumulating electrostatic information on the electrostatic information-recording medium, it is accumulated while migrating apparently through the resin layer under the action of an electric field. Thus, this layer has a relation to the capability of the accumulated charges to be retained and makes a difference in the potential of the accumulated charges retained depending upon the type and thickness of resin.

Referring then to the heat-resistant resin, it is also required to have an insulating property of $10^4$ 106.cm or more as expressed in terms of specific resistance and, by way of example alone, may include such thermosetting resins as phenolic resin, furan resin, xylene-formaldehyde resin, ketone-formaldehyde resin, urea resin, melamine resin, aniline resin, alkyd resin, unsaturated polyester resin, epoxy resin, triacyl isocyanurate, formaldehyde resin of tris(2-hydroxyethyl)isocyanurate resin, acrolein resin, phosphonitrile dihalide type of polymeric derivatives, curing maleimide resin, thermosetting cyclopentadiene resin, products obtained by the crosslinking reaction of cyclic urea resin and triazine resin; such thermoplastic resins as polyethylene, ethylene-vinyl acetate copolymers, ethylene/ethyl acrylate-ethylene/methyl acrylate copolymers, polypropylene, polybutylene, methylpentene resin, polystyrene, poly-para-xylenes, polyvinyl acetate, polyacrylate, polymethacrylate, vinyl chloride resin, polyvinylidene chloride resin, fluoropolymers, polyacrylonitrile, polyvinyl ether, polyvinyl ketone, polyether, polycarbonate, thermoplastic polyester, polyamide, diene plastics, polyurethane plastics, petroleum resin, rosin derivatives and terpene resin; such polymers as aromatic polyamide, polyphenylene, polyxylenes, polyphenylene oxide, polysulfone and aromatic heterocyclic polymers; silicone resin and inorganic types of plastics; and naturally occurring rubber, cellulose, protein and starch types of plastics. Thus, it is preferred to use a resin having a glass transition temperature higher than that of the resin—which forms the above-mentioned resin layer having a low glass transition temperature. Usually, use may be made of a resin having a glass transition temperature of 40° C. or higher.

For instance, styrene resins having molecular weights (Mw) of 348 and 53200 have glass transition temperatures of—14° C. and 53° C., respectively. Thus, it is possible to laminate together the same class of resins differing in molecular weight and hence glass transition temperature as the resin having a low glass transition temperature and the heat-resistant, insulating layer.

Particularly preferable as the heat-resistant, insulating resin are fluoropolymers such as polytetrafluoroethylene, fluorinated ethylene propylene, tetrafluoroethylene-perfluoroalkyl vinyl ether copolymers, polyether ether ketone resin and poly-para-xylenes having the following structural formulae:

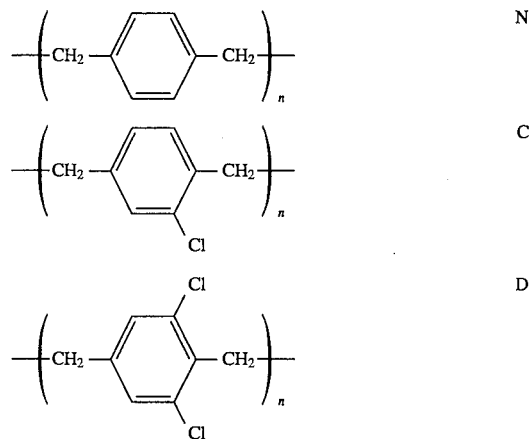

It is noted that the above-mentioned C type is called Parylene C—poly(monochloro-p-xylene)—having a chlorine atom at one of sites on the benzene ring other than the main chain site, and the D type called Parylene D—poly-(dichloro-p-xylene)—having chlorine atoms at two of such sites.

These heat-resistant layers may be formed as by coating or dipping of a solution of the resin dissolved in a suitable solvent.

For the heat-resistant, insulting layer, use may also be made of such inorganic materials as inorganic oxides—for instance, $SiO_2$, $Al_2O_3$, $ZrO_2$, $TiO_2$, $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SeO_2$, $Ta_2O_5$, $WO_3$, $V_2O_5$, $Y_2O_5$, $Y_2O_3$, $BaTiO_3$, $Bi_2TiO_5$, CaO—SrO, CaO—$Y_2O_3$, Cr—$SiO_2$, $LiTaO_3$, $PbTiO_3$, $PbZrO_3$, $ZrO_2$—Co and $ZrO_2$—$SiO_2$, and inorganic compounds—for instance, AlN, BN, NbN, Si$_3$N$_4$, TaN, TiN, VN, ZrN, SiC, TiC, WC and Al$_4$C$_3$. Particular preference is given to silicon dioxide. These inorganic material layers may be formed by glow discharge, vapor deposition or sputtering, or forced oxidation or nitriding of metals or semi-conductors.

The resin layer having a low glass transition temperature and the heat-resistant resin layer may both contain finely divided, photoconductive or electrically conductive materials in order to stabilize charges carried thereby. The finely divided, photoconductive materials used, for instance, may include such inorganic photoconductors as amorphous silicon, crystalline silicon, amorphous selenium, crystalline selenium, cadmium sulfide and zinc oxide or such organic photoconductors as polyvinyl-carbazole, phthalocyanine and azo pigments. As the electrically conductive materials, use may be made of elements belonging to various groups in the periodic table—for instance, IA (alkali metals), IB (copper group), IIA (alkali earth metals), IIB (zinc group), IIIA (aluminium group), IIIB (rare earth metals), IVB (titanium group), VB (vanadium Group), VIB (chromium group), VIIB (manganese group), VIII (iron and platinum groups), IVA (carbon group, e.g., carbon, silicon, germanium, tin and lead), VA (nitrogen group, e.g. antimony and bismuth) and VIA (oxygen group, e.g. sulfur, selenium and tellurium), all being used in fine powders. Of the above-mentioned elements, the metals may be used in the form of metal ions, finely divided metal alloys, organic metals or complexes. Furthermore, the above-mentioned elements may be used in the form of oxides, phosphates, sulfates or halogenides. Particular preference is given to carbon, gold, copper and aluminium.

Upon vaporized at a pressure as low as about 10—10$^{-3}$ Torr with equipment for vapor deposition working at low pressures, these photoconductive or electrically conductive materials coalesce on the heated resin layer in a state as ultrafine as about 10–0.1 μm in size, so that they can penetrate through the resin layer and exist therein. Alternatively, the fine particles may be dispersed in a resin solution at the time of coating.

The heat-resistant, insulating layer 11$b$, shown in FIGS. 1$a$–$b$, should preferably have a thickness of 0.1 μm or more. At less than 0.1 μm in thickness, charges opposite in polarity to the accumulated information-carrying charges are likely to be injected in that layer due to tunneling and other phenomena, bringing about charge leakage. Although not critical in thickness, the resin layer 11$a$ having a low glass transition temperature should preferably be made as thin as possible. This is because for one thing, at more than 100 μm in thickness it is difficult to read potential when the information-carrying charges are reproduced; for another, a certain resolution is required when the information-carrying charges are reproduced. In addition, the thicker the resin layer, the more likely is the electric line of force to fall into disarray. However, it is understood that at less than 0.1 μm in thickness, the resin layer is greatly affected by pinholes, etc., failing to serve well.

No particular limitation is placed on the thickness of the resin layer 11$a$ having a low glass transition temperature, shown in FIGS. 2$a$–$b$, but the heat-resistant, insulating layer 11$b$ laminated on it should preferably a thickness of 0.1 μm. At less than 0.1 μm in thickness, the accumulated information-carrying charges are likely to leak out.

The electrode of the electrostatic information-recording medium, which is not critical with the exception that it has a specific resistance value of 10$^6$ Ω.cm or less, may be formed of electrically conductive films of inorganic metals or inorganic metal oxides, or of such organic materials as quaternary ammonium salts. Such electrodes may be formed by suitable procedures such as vapor deposition, sputtering, CVD, coating, plating, dipping and electrolytic polymerization.

The thickness of the electrode should be varied depending upon the electrical properties of the material forming it and the magnitude of voltage applied for recording information. For instance, an aluminium electrode may be about 100 to 3000 angstroms in thickness, and be formed between the support and the charge-retaining layer over all the surfaces or according to the pattern of the charge-retaining layer formed. When the charge-retaining layer is formed of a film material having a certain strength in itself, such an electrode material as mentioned above may be formed on that film material by means of vapor deposition or the like.

The electrostatic information-recording medium according to this invention may include a support.

FIGS. 1$b$ and 2$b$ show embodiments of the electrostatic information-recording medium including a support. A support 15 is not critical in terms of material and thickness, if it has enough strength to support the recording medium well. For instance, use may be made of flexible plastic films, metal foils or paper, or rigid glass, plastic or metal sheets (which may also serve as an electrode). When the recording medium is in the form of a flexible film, tape or disk, on the one hand, a flexible plastic film may be used and when the recording medium is required to have strength, on the other hand, a rigid sheet or an inorganic material such as glass may be used. It is noted that such a support can be dispensed with, if the charge-retaining layer is formed of a film material having a certain strength in itself.

In some cases, the electrostatic information-recording medium according to this invention may be required to be transparent to light when recording or reproducing information. This may be achieved by providing anti-reflection film and/or regulating the thicknesses of the electrode and charge-retaining layers, thereby imparting an anti-reflection effect to the recording medium.

The electrostatic information-recording medium may be provided in various forms depending upon what type of information is to be recorded or how to record information. For instance, when used with an electrostatic camera (set forth in co-pending Japanese Patent Application No. 63(1988)-121591 specifcation), it may be in the form of an ordinary film (for single or continuous frames), a card or a disk. When used to record digital or analog information as by laser, it may similarly be in the form of a tape, disc or card.

In the description that follows, how to record and reproduce electrostatic information will be explained more specifically with reference to FIGS. 3$a$–$d$, wherein reference numeral 1 stands for a photosensitive member, 5 a support, 7 an electrode, 9 a photoconductive layer, 10 an electrostatic information-recording medium, 11 a charge-retaining layer, 13 an electrode, 15 a support, 17 a power source and 18 information-light.

For recording information in the electrostatic information-recording medium according to this invention, a photosensitive member is used, in which a photoconductive layer such as an a-selenium layer or an organic photoconductive layer is laminated on an electrode.

As illustrated in FIG. 3$a$, the photosensitive member 1 is formed by laminating the electrode 7, having a thickness of 1000 angstroms and consisting of indium oxide-tin oxide (ITO), on the glass support 5 of 1 mm in thickness and laminating the photoconductive layer 9 of about 10 μm in thickness on the electrode 7, and is then located in opposition to the electrostatic information-recording medium 10 through a gap of about 10 μm.

Figure 3A:
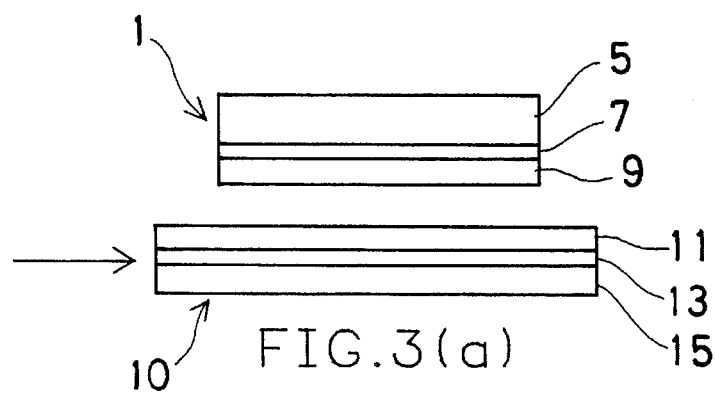
FIGS. 3a–b are diagrammatic sketches for illustrating the process for recording and reproducing electrostatic information according to this invention.
Figure 3B:
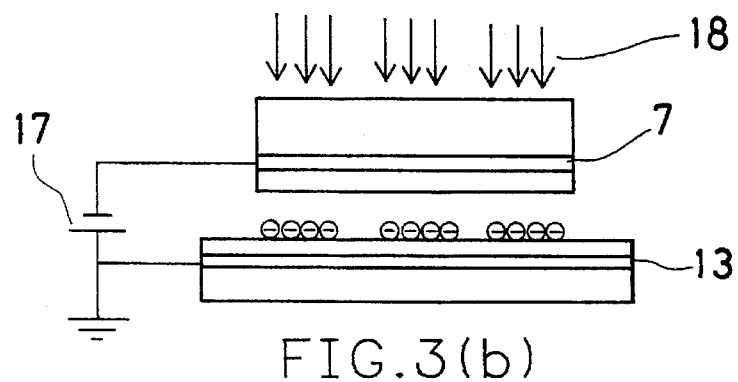

As shown in FIG. 3b, voltage is then applied from the power source 17 between the electrodes 7 and 13. In the dark, there will be no change between the electrodes due to the photoconductor 9 being a high resistance body, if the voltage applied to the gap is less than the firing voltage following the Paschen's law.

Upon the information-light 18 incident from the glass support 5, a portion of the photoconductor 9, upon which the light 18 strikes, is made so electrically conductive that discharge takes place to accumulate charge information corresponding to the light 18 on the charge-retaining layer.

Figure 3C:
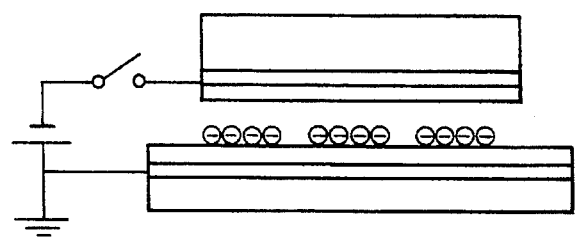
Figure 3D:
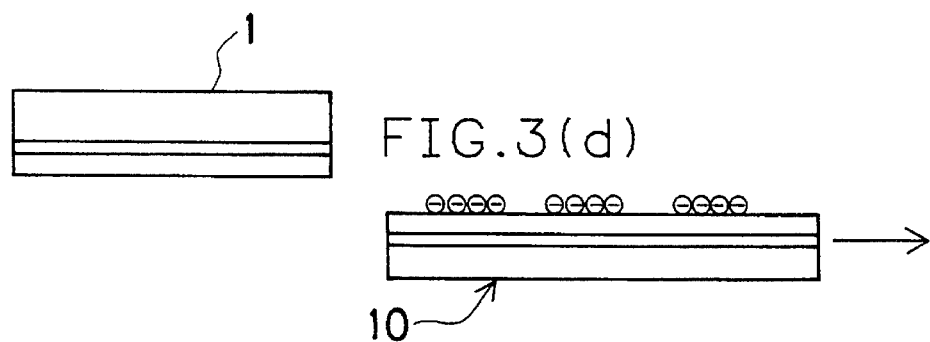

The power source 17 is put off, as shown in FIG. 3c, and the electrostatic information-recording medium 10 is then separated from the photosensitive member 1 (see FIG. 3d) to accumulate the charge information on the surface of the recording medium.

Figure 4A:
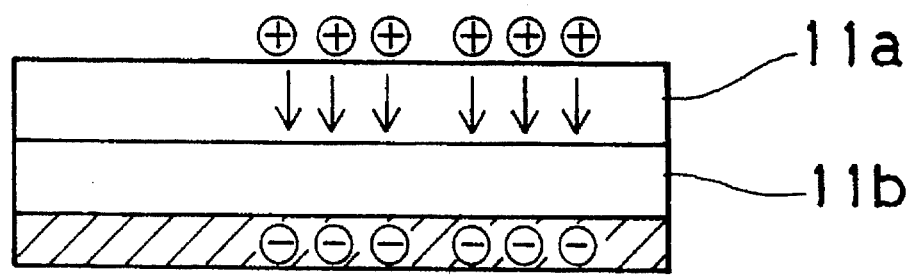
FIGS. 4a–b are diagrammatic sketches illustrating the stabilization of electrostatic information in the first electrostatic information-recording medium according to this invention.
Figure 4B:
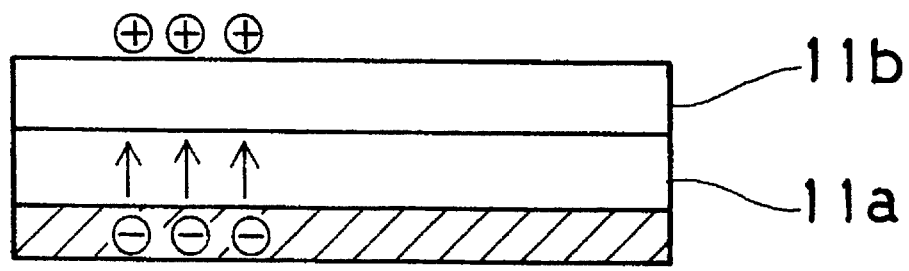

The charge information retained in the form of surface potential is unstable with respect to atmospheric moisture, etc. According to this invention, however, the electrostatic information-recording medium is heated to a temperature that is higher than the glass transition temperature of the resin layer having a low glass transition temperature but lower than the charge leakage temperature of the heat-resistant, insulating layer after the charge information have been accumulated in the form of surface potential, whereby the electrostatic information can be stabilized. As diagrammatically sketched in FIG. 4a for the electrostatic information-recording medium shown in FIGS. 1a–b and in FIG. 4b for the electrostatic information-recording medium shown in FIGS. 2a–b, the reason why the electrostatic information can be stabilized by heating would be that the charge information or charges induced thereby migrate apparently through the resin layer having a low glass transition temperature—made electrically conductive by heating—under the action of an electric field, and are stored in the resin layer electrically insulated by cooling.

Reference will now be made to how to input information-light in recording and reproducing electrostatic information according to this invention. This may be achieved with an electrostatic camera of high resolution or laser.

Referring first to the electrostatic camera of high resolution, a recording member constructed from a photosensitive material and the electrostatic information-recording medium is used in place of a photographic film to form an electrostatic latent image on the charge-retaining layer depending upon the quantity of incident light. The shutter used may be of either the mechanical or the electrical type.

A color filter may also be used to separate optical information into R, G and B components through a prism and extract them as parallel beams. For color photographing, one frame may then be formed either by three sets of electrostatic information-recording media separated into the R, G and B colors or by a set of R, G and B images arranged on one plane.

For laser recording systems, argon laser (514.488 nm), helium-neon laser (633 nm) or semiconductor laser (780 nm, 810 nm) may be used as the light source. Voltage is then applied, while the photosensitive member is brought in close, planar contact with or in opposition to the electrostatic information-recording medium at a constant interval. In this case, the electrode may be of the same polarity as that of the carrier of the photosensitive member. In that state, laser exposure corresponding to picture image, character, cord or line signals is carried out by scanning. Analog recording of information such as picture images is made by the modulation of the intensity of laser light, while digital recording of characters, cords or line pictures is done by the on-off control of laser light. Dotted imaging may also be carried out under the dot generator on-off control of laser light. It is noted that the spectral properties of the photoconductive layer in the photosensitive member need not be panchromatic, and may be well sensitive to the wavelength of the laser light source.

While reference has been made to recording electrostatic information with the photosensitive member, the electrostatic information-recording medium according to this invention may be equally applicable to recording and reproducing electrostatic information with an electrode needle or ion-flow head, or with an optical printer such as a laser printer.

Reference will now be made to how to reproduce the thus recorded electrostatic information.

Figure 1B:
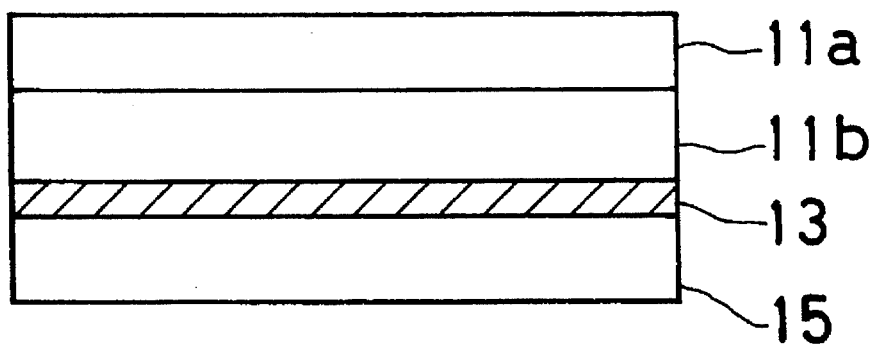
Figure 5:
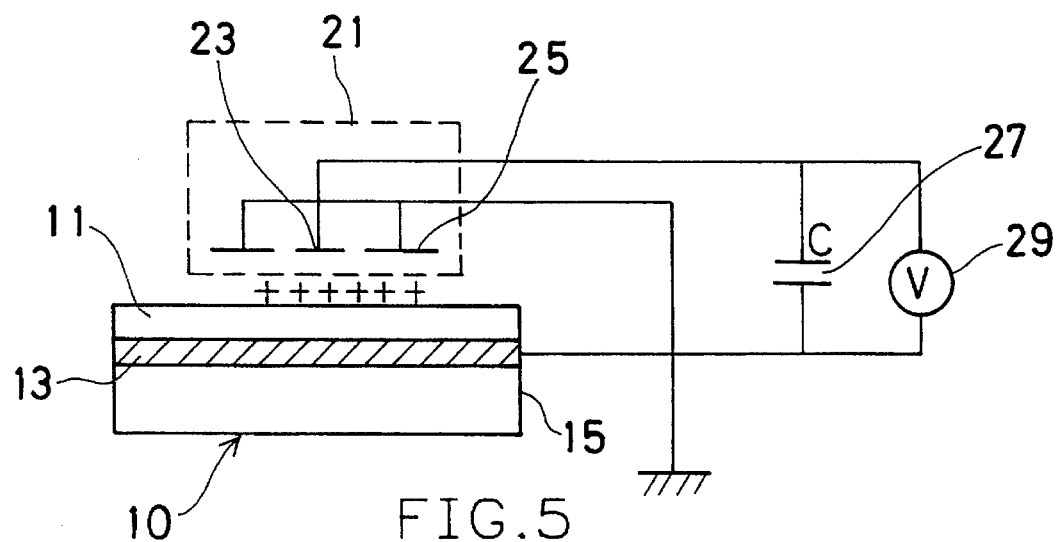
FIG. 5 is a diagrammatic sketch showing an example of a D.C. amplification type of potential reading system.

An example of reading potential in reproducing electrostatic information is illustrated in FIG. 5, wherein the same parts as in FIGS. 1a–b are indicated by the same reference numerals. It is noted that reference numeral 10 stands for an electrostatic information-recording medium, 21 a potential reader, 23 a detecting electrode, 15 a guard electrode, 27 a capacitor and 29 a voltmeter.

In order to reproduce the information from the electrostatic information-recording medium on which the information-carrying charges have been accumulated, the potential reader 21 is first located in opposition to the surface of the charge-retaining layer. Then, an electric field established by the charges accumulated on the charge-retaining layer acts on the detecting electrode 23, inducing on the surface of the detector 23 charges in the same amount of those on the recording medium. Since the capacitor 27 is charged with charges opposite in polarity to such induced charges, there is a potential difference corresponding to the accumulated charges across the capacitor's electrode, which can be in turn read on the voltmeter 29, thereby determining the potential of the charge-retaining information. Then, an electrostatic latent image can be produced in the form of electrical signals by scanning the surface of the charge-retaining layer with the reader 21. It is noted that only with the detector 23, there is a drop of resolution due to the action of an electric field (an electric line of force) defined by charges over a range wider than the region of the recording medium opposite to the detecting electrode; hence, the guard electrode 25 may be grounded around the detecting electrode. According to such an arrangement in which the electric line of force acts vertically to a plane, it is possible to read the potential of a region having an area nearly equal to that of the detecting electrode. Since the accuracy and resolving power of potential reading vary largely depending upon the geometry and size of the detecting and guard electrodes as well as the space between them and the electrostatic information-recording medium, it is essentially required to design them while taking into account the optimum conditions to meet the performance demanded.

Figure 6:
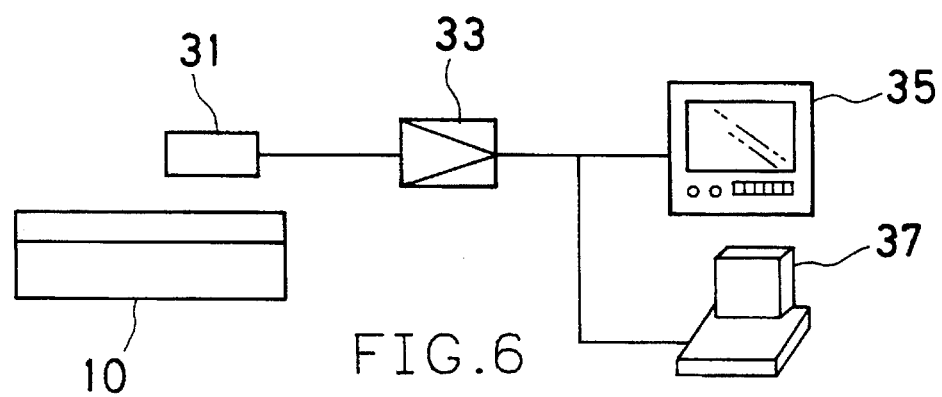
FIG. 6 is a diagrammatic sketch of how to record and reproduce electrostatic information.

FIG. 6 is a schematic view showing the process for reproducing electrostatic information according to this invention, with reference numeral 31 indicating a potential reader, 33 an amplifier, 35 a CRT and 37 a printer.

Referring to this drawing, a charge potential is detected by the potential reader 31, and the resulting output is amplified by the amplifier 33 for display on the CRT 35 or printing-out with the printer 37. In this case, the region to be read may be arbitrarily selected and outputted at any desired time, or may be repeatedly reproduced. Reading may also be optically achieved with a material whose optical properties vary by an electric field, for instance, an electrooptical crystal. Since the electrostatic latent image is obtained in the form of electrical signals, it may further be recorded in other recording media, if required.

The first electrostatic information-recording medium according to this invention and how to record and reproduce electrostatic information with this recording medium will now be explained in greater detail with reference to the following examples.

EXAMPLE 1

An aluminium electrode was deposited by vacuum vapor deposition ($10^{-5}$ Torr) at a film thickness of 1000 angstroms on a heat-resistant, insulating layer formed of a tetrafluoroethylene-hexafluoropropylene copolymer (FEP) film (made by Du Pont) having a glass transition temperature of 130° C., a specific resistance of $10^{18}$ $\Omega$.cm or higher, a water absorption of 0.01% and a thickness of 12.5 μm. Then, a 10% toluene solution of a styrene-butadiene rubber having a glass transition temperature of –70° C., a specific resistance of $10^{15}$ $\Omega$.cm and a water absorption of 0.25% was spin-coated (at 1000 rpm for 30 seconds) on the opposite side of the FEP film at a dry coverage of 1.0 μm to form a resin layer having a low glass transition temperature, thereby preparing such an electrostatic information-recording medium as shown in FIGS. 1a–b.

Then, this electrostatic information-recording medium was charged on the resin layer having a low glass transition temperature to a surface potential of ±100 V by corona charging, followed by heating at 40° C. for 60 seconds in an oven. As a result, the surface potential, although changed to ±90 V, was found to be retained in the electrostatic information-recording medium.

After allowed to stand at normal temperature and humidity for 30 days, the surface potential was found to be kept at ±90 V. Even allowed to stand under accelerated testing conditions at 60° C. and 20% R.H. for 30 days, a surface potential of ±80 V was maintained, and even when allowed to stand under high-humidity conditions of 95% R.H. at 40° C. for 30 days, a surface potential of ±70 V was maintained.

EXAMPLE 2

An aluminium electrode was deposited by vacuum vapor deposition ($10^{-5}$ Torr) on a 1-mm thick glass substrate at a film thickness of 1000 angstroms, and a 5% solution of a fluoropolymer ("Cytop"—trade name—made by Asahi glass Co., Ltd. and having a glass transition temperature of 100° C., a water absorption of 0.01% and a specific resistance of $1\times10^{18}$ $\Omega$.cm) in a fluorine type of solvent was coated on the aluminium electrode by a blade coater 8 mil, followed by drying at room temperature for 3 hours. Thus, a heat-resistant resin layer of about 7 μm in thickness was obtained.

A 5% solution of an acrylic ester ("Diyanal" made by Mitsubishi Rayon Co., Ltd. and having a glass transition temperature of 40° C., a water absorption of 0.03% and specific resistance of $1\times10^{14}$ $\Omega$.cm) in a mixed toluene/MEK solvent (1:1) was coated on the thus obtained heat-resistant resin layer, and then dried to deposit thereon a 3-μm thick resin layer having a low glass transition temperature, thereby obtaining such an electrostatic information-recording medium as shown in FIGS. 1a–b.

Then, this electrostatic information-recording medium was charged thereon to a surface potential of ±100 V by corona charging, followed by heating at 45° C. for 60 seconds in an oven. As a result, the surface potential, although changed to ±+80 V, was found to be retained in the electrostatic information-recording medium.

After allowed to stand at normal temperature and humidity for 30 days, the surface potential was found to be kept at +80 V. Even when allowed to stand under accelerated testing conditions at 60° C. and 20% R.H. for 30 days, a surface potential of ±70 V was maintained, and even when allowed to stand under high-humidity conditions of 95% R.H. at 40° C. for 30 days, a surface potential of ±60 V was maintained.

EXAMPLE 3

Figure 2B:
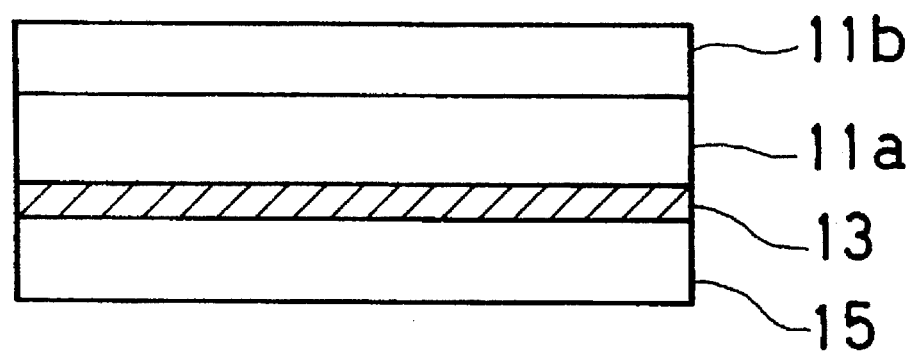

Such an electrostatic information-recording medium as shown in FIGS. 2a–b was prepared by following the procedures of Ex. 2 with the exception that the heat-resistant, insulating layer and the resin layer having a low transition temperature were reversed in the order of deposition.

This electrostatic information-recording medium was charged thereon to a surface potential of ±100 V by corona charging, followed by heating at 45° C. for 60 seconds in an oven. As a result, although the surface potential was changed to ±80 V, the electrostatic information was found to be retained in the electrostatic information-recording medium.

After allowed to stand at normal temperature and humidity for 30 days, the surface potential was found to be kept at ±80 V, indicating that there was no drop of the surface potential at all. Even when allowed to stand under accelerated testing conditions at 60° C. and 20% R.H. for 30 days, a surface potential of ±70 V was maintained, and even when allowed to stand under high-humidity conditions of 95% R.H. at 40° C. for 30 days, a surface potential of ±60 V was maintained.

EXAMPLE 4

A 1.7-μm thick, thermally oxidized silicon layer (made by Mitsubishi Metal Corporation) formed by the thermal oxidation of a silicon wafer was used as a heat-resistant, insulating material. A 40% solution of a poly ($\alpha$-pinene) having a glass transition temperature of 64° C. ("Picolight A115" made by Riken Hercules Co., Ltd.) in 40% monochlorobenzene was spin-coated (at 3000 rpm for 20 seconds) on the silicon layer at a dry coverage of 2.5 μm to form a resin layer having a low transition temperature, thereby preparing such an electrostatic information-recording medium as shown in FIGS. 1a–b.

Using a silicon wafer as an electrode, this electrostatic information-recording medium was then charged on the resin layer having a low glass transition temperature to a surface potential of ±170 V by corona charging, followed by heating at 100° C. for 1 hour on a hot plate. As a result, the surface potential, although changed to +150 V or –120 V, was found to be retained in the electrostatic information-recording medium.

After allowed to stand at normal temperature and humidity for 30 days, the surface potential was found to be kept at +150 V or –120 V. Even when allowed to stand under accelerated testing conditions at 60° C. and 20% R.H. for 30 days, a surface potential of +140 V or –110 V was maintained, and even when allowed to stand under high-humidity conditions of 95% R.H. at 40° C. for 30 days, a surface potential of +140 V or –100 V was maintained.

EXAMPLE 5

A 1.7-μm thick, thermally oxidized silicon layer (made by Mitsubishi Metal Corporation) formed by the thermal oxidation of a silicon wafer was used as a heat-resistant, insulating material. A 40% solution of a poly (β-pinene) having a glass transition temperature of 63.5° C. ("Picolight S115" made by Riken Hercules Co., Ltd.) in 40% monochlorobenzene was spin-coated (at 2000 rpm for 20 seconds) on the silicon layer at a dry coverage of 4.4 μm to form a resin layer having a low transition temperature, thereby preparing such an electrostatic information-recording medium as shown in FIGS. 1a–b.

Using a silicon wafer as an electrode, this electrostatic information-recording medium was then charged on the resin layer having a low glass transition temperature to a surface potential of ±250 V by corona charging, followed by heating at 100° C. for 1 hour on a hot plate. As a result, the surface potential, although changed to +110 V, was found to be carried in the electrostatic information-recording medium.

After allowed to stand at normal temperature and humidity for 30 days, the surface potential was found to be kept at ±110 V. Even when allowed to stand under accelerated testing conditions at 60° C. and 20% R.H. for 30 days, a surface potential of ±100 V was maintained, and even when allowed to stand under high-humidity conditions of 95% R.H. at 40° C. for 30 days, a surface potential of ±105 V was maintained.

EXAMPLE 6

Figure 9:
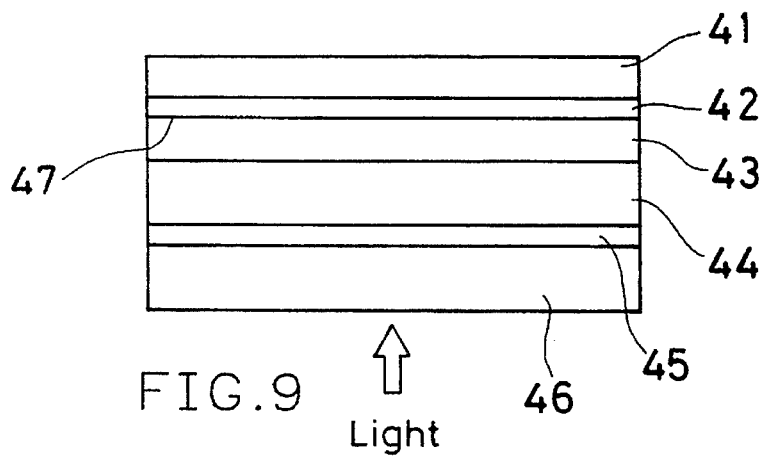
FIG. 9 is a diagrammatic sketch showing one embodiment of the 3rd electrostatic information-recording medium according to this invention.

A 1.7-μm thick, thermally oxidized silicon layer (made by Mitsubishi Metal Corporation) formed by the thermal oxidation of a silicon wafer was used as a heat-resistant, insulating material. A 40% solution of a poly (α-pinene) having a glass transition temperature of 64° C. ("Picolight A115" made by Riken Hercules Co., Ltd. ) in 40% monochlorobenzene was spin-coated (at 3000 rpm for 20 seconds) on the silicon layer at a dry coverage of 2.5 μm to form a resin layer having a low transition temperature, thereby preparing such an electrostatic information-recording medium as shown in FIG. 9.

Using a silicon wafer as an electrode, this electrostatic information-recording medium was then charged on the resin layer having a low glass transition temperature to a surface potential of ±170 V by corona charging, followed by heating at 100° C. for 1 hour on a hot plate.

After allowed to stand at normal temperature and humidity for 30 days, the surface potential was found to be kept at ±170 V. Even when allowed to stand under accelerated testing conditions at 60° C. and 20% R.H. for 30 days, a surface potential of +150 V or −120 V was maintained, and even when allowed to stand under high-humidity conditions of 95% R.H. at 40° C. for 30 days, a surface potential of +160 V or −135 V was maintained.

EXAMPLE 7

Preparation of Photosensitive member

A mixed solution composed of 10 g of poly-N-vinylcarbazole (made by Anan Koryo K.K.), 10 g of 2,4,7-trinitrofluorenone, 2 g of a polyester resin (as a binder; "Vylon 200" made by Toyobo Co., Ltd. ) and 90 g of tetrahydrofuran (THF) was prepared in a dark place, and was then coated on a glass substrate (of 1 mm in thickness) sputtered with an ITO electrode at a thickness of about 1000 angstroms with the use of a doctor blade. The product was dried at 60° C. for about 1 hour while supplying air thereto to obtain a photosensitive member having a photoconductive layer of about 10 μm in thickness. For complete drying purposes, air drying was carried out for a further 1 day.

Process for Recording Electrostatic Information

Using the process for recording and reproducing electrostatic information, illustrated in FIGS. 3a–d, the above-mentioned photosensitive member and the electrostatic information-recording medium prepared in Ex. 1 were exposed to light with the application of voltage to obtain a charge image of −150 V at a line pattern width of 20 μm. After that, they were heated at 40° c. for 60 seconds.

For the purpose of comparison, an electrostatic information-recording medium including on an electrode an FEP layer alone was prepared according to the procedures of Ex. 1, and was then used to record electrostatic information in a similar manner as mentioned above.

Then, the electrostatic information-recording media according to this invention and for the purpose of comparison were subjected to accelerated testing at 40° C. and 95% R.H. for 30 days to determine their surface potentials. Also, these were used for reproduction by toner development.

The electrostatic information-recording medium of this invention was decreased to a surface potential of −140 V but remained stable there, and the pattern of 20 μm could be resolved by toner development.

On the other hand, the comparative medium including no resin layer having a low glass transition temperature was found to undergo no change in the surface potential or remain at −150 V, but failed to resolve the 20-μm pattern by reproduction by toner development.

The second electrostatic information-recording medium according to this invention and the process for recording and reproducing electrostatic information with this recording medium will now be explained.

Figure 7:
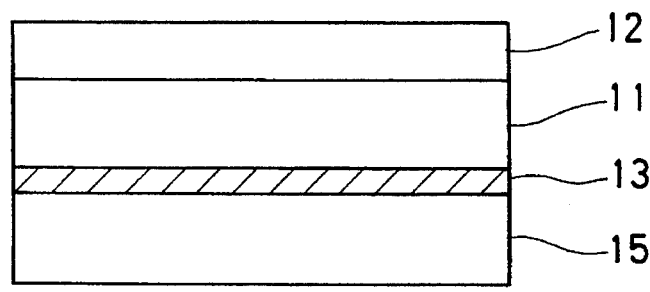
FIG. 7 is a sectional sketch of the second electrostatic information-recording medium according to this invention.

The second electrostatic information-recording medium of this invention is shown at 3 in the sectional view presented as FIG. 7, wherein reference numeral 11 stands for a fluoropolymer layer, 12 a pentafluorostyrene polymer layer, 13 an electrode and 15 a support.

The fluoropolymer layer 11 is formed of a fluoropolymer having an insulating property of $10^{14}$ Ω.cm or more as expressed in terms of specific resistance.

As the fluoropolymers, for instance, use may be made of poly (tetrafluoroethylene) (PTFE), tetrafluoroethylene-perfluoroalkyl vinyl ether copolymer (PFA), tetrafluoroethylene-hexafluoropropylene copolymer (FEP), tetrafluoroethylene-hexafuloropropylene-perfluoroalkyl vinyl ether copolymer (EPE), tetrafluoroethylene-ethylene copolymer (ETFE), poly(chlorotrifluoroethylene) (PCTFE) and chlorotrifluoroethylene-ethylene copolymer (ECTFE). In addition, these resins may be used in admixture with thermoplastic resin, thermosetting resin, radiation curing resin such as ultraviolet or electron beam curing resin or engineering plastics whose hydrogen atoms are partly or wholly substituted by fluorine atoms, or fluorine-containing resins.

Preferably, use may also be made of the following fluorine-containing resins: Fluorine-containing thermoplastic resin comprising a cyclic recurring unit (units) represented by the following general formulae:

(1)

17

-continued and/or

(2)

wherein n is 1 or 2, and having such a molecular weight as to give an intrinsic viscosity of at least 0.1 at 50° C., or Fluorine-containing thermoplastic resin comprising (a) a cyclic recurring unit (units) represented by the following general formulae:

(1)

and/or

(2)

wherein n is 1 or 2, and (b) a recurring unit represented by the following general formula:

$$-(CF_2-CFX)-$$
(3)

wherein X is F, Cl, $-O-CF_2CF_2CF_3$, $-O-CF_2CF(CF_3)OCF_2CF_2SO_3F$ or $-O-CF_2CF_2CF_2COOCH_3$, with the content of the recurring unit (a) being at least 80%, and having such a molecular weight as to give an intrinsic viscosity of at least 0.1 at 50° C.

The recurring unit (a) is obtained by the radically cyclic polymerization of a perfluoroalkyl vinyl ether expressed by the following general formula:

$$CF_2=CF-O-(CF_2)_nCF=CF_2$$

wherein n is 1 or 2, or perfluorobutenyl vinyl ether. Similarly, the resins comprising the recurring units (a) and (b) are obtained by the radical polymerization of a perfluorovinyl ether having the following general formula:

$$CF_2=CF-O-(CF_2)_nCF=CF_2$$

wherein n is 1 or 2 with a monomer having the following general formula:

$$CF_2=CFX$$

wherein X is F, Cl, $-O-CF_2CF_2CF_3$, $-O-CF_2CF(CF_3)OCF_2CF_2SO_3F$ or $-O-CF_2CF_2CF_2COOCH_3$.

These resins, for instance, are referred to in Japanese Provisional Patent Publication No.1(1989)-131215.

A layer of such a fluoropolymer may be laminated on the electrode layer by coating or dipping of a solution of the fluoropolymer dissolved in a fluorine type of solvent. Alternatively, a fluoropolymer film may be applied on the electrode through an adhesive or the like. Further, an electrode-forming material may be laminated on one side of the fluoropolymer film by means of vapor deposition, etc., while a pentafluorostyrene polymer layer may be coated on the other side.

The fluoropolymer layer may preferably have a thickness of 0.1 to 5 μm.

The pentafluorostyrene polymer layer to be laminated on the fluoropolymer layer is obtained by the radical polymerization of pentafluorostyrene ($C_6F_5-CH=CH_2$).

Alternatively, the pentafluorostyrene polymer layer may be formed of a copolymer of pentafluorostyrene with such a comonomer as $C_nF_{2n+1}-CH=CH_2$ or $C_nF_{2n+1}-CF=CF_2$ wherein n stands for an integer of 5–10), or $CF_2=CF-C_6H_5$. This copolymer is then obtained by the radical, anionic or cationic polymerization of 100–1% by weight of pentafluorostyrene with 0–99% by weight of the comonomer.

When the pentafluorostyrene polymer cannot be coated on the above-mentioned fluoropolymer layer, the fluoropolymer may be treated on the surface by plasma or other means to increase the capability to be coated prior to providing the pentafluorostyrene polymer.

In view of its moldability and solubility in solvents, the pentafluorostyrene polymer used may preferably have a molecular weight of 10,000 to 2,000,000.

For the lamination of the pentafluorostyrene polymer layer, a solution of the pentafluorostyrene polymer dissolved in a fluorine type of solvent may be provided on the above-mentioned fluoropolymer layer by coating or dipping.

The pentafluorostyrene polymer layer may have a thickness of 0.1 μm to 5 μm, but should preferably be thinner than the fluoropolymer layer.

It is noted that in order to improve the stability of charges, these fluoropolymer and pentafluorostyrene polymer layers may additionally contain photoconductive and electrically conductive materials in an ultrafine form.

The support 15 and electrode 13 used may be the same as used with the first electrostatic information-recording medium.

It is understood that after recording information, the electrostatic information-recording medium may be provided on the surface with a protective plastic film to protect it against surface failure or attenuation of the information-carrying charges stored. For the same purpose, a plastic solution may be coated or otherwise vapor-deposited on the surface of that medium. The protecting film may be a few hundreds angstroms to a few tens μm in thickness, at which the reproduction of information can be well achieved.

When it is required to impart photosensitivity to the electrostatic information-recording medium at the same time, the fluoropolymer and pentafluorostyrene polymer layers may be successively provided on the photoconductive layer formed on the electrode.

As is the case with the first electrostatic information-recording medium, the recording and reproduction of information with the second electrostatic information-recording medium may be carried out, as illustrated in FIGS. 3a–d, wherein reference numeral 1 is a photosensitive member, 5 a support for a photoconductive layer, 7 an electrode formed in the photosensitive member, 9 a photoconductive layer and 17 a power source.

The photosensitive member, for instance, is formed by providing an about 10-μm thick, organic photoconductive layer 9 on the surface of a 1000-angstrom thick, ITO transparent electrode layer 7 formed on a 1-mm thick glass support 5.

As shown in FIG. 3a, an electrostatic information-recording medium 3 is first located with respect to the photosensitive member 1 through a gap of about 10 μm.

Then, voltage is impressed through the power source 17 between the electrodes 7 and 13.

Upon incidence of light 18 through the electrostatic information-recording medium, a portion of the photoconductor 9, on which the light impinges, is made so electrically conductive that the recording medium discharge and accumulates thereon information-retaining charges. It is understood that the light 18 may be allowed to be incident upon the photoconductor 9 through the photosensitive member 1.

Then, the power source 17 is put off to separate the recording medium 10 from the photosensitive member 1. In this manner, the formation of an electrostatic latent image is completed.

When this process for recording and reproducing electrostatic information is used for planar analog recording, the obtained resolution is as high as that achieved with silver photography, and the information-retaining charges are protected in the charge-retaining layer and stored over an extended period without discharging.

Reference will now be made to how to input information to this electrostatic information-recording medium. This may be achieved with an electrostatic camera or laser. Referring first to the electrostatic camera, a recording member constructed from a photosensitive material and the electrostatic information-recording medium is used in place of a photographic film. The shutter used may be of either the mechanical or the electrical type.

A color filter may also be used to separate optical information into R, G and B components through a prism and extract them as parallel beams. For color photographing, one frame may then be formed either by three sets of electrostatic information-recording media separated into the R, G and B colors or by a set of R, G and B images arranged on one plane.

For laser recording systems, argon laser (514.488 nm), helium-neon laser (633 nm) or semiconductor laser (780 nm, 810 nm) may be used as the light source. Voltage is then applied, while the photosensitive member is brought in close, planar contact with or in opposition to the electrostatic information-recording medium at a constant interval. In this case, the electrode may be of the same polarity as that of the carrier of the photosensitive member. In that state, laser exposure corresponding to picture image, character, cord or line signals is carried out by scanning. Analog recording of information such as picture images is made by the modulation of the intensity of laser light, while digital recording of characters, cords or line pictures is done by the on-off control of laser light. Dotted imaging may also be carried out under the dot generator on-off control of laser light. It is noted that the spectral properties of the photoconductive layer in the photosensitive member need not be panchromatic, and may be well sensitive to the wavelength of the laser light source.

This electrostatic information-recording medium may be used as an electrostatic recording medium using an electrode needle or ion-flow head, an optical printer such as a laser printer, or a recording medium making use of electron beam or ion impinging. In particular, this is best-suited for an electrostatic information-recording medium using a photosensitive member.

It is understood that as is the case with the process for reproducing electrostatic information with the first electrostatic information-recording medium, the electrostatic information recorded in this electrostatic information-recording medium may be reproduced by the processes illustrated in FIGS. 4 and 5.

In what follows, the second electrostatic information-recording medium according to this invention and how to record and reproduce electrostatic information with this recording medium will be explained specifically but not exclusively with reference to the following examples.

EXAMPLE 8

Forty (40) g of pentafluorostyrene (made by Central Yakuhin K.K.) purified by distillation under reduced pressure (48° C./20 mmHg) and 0.06 g of azobisisobutyronitrile were placed in an ampule made of pressure-resistant glass, in which they were frozen and degasified twice. After that, pentafluorostyrene was radically polymerized in a warm bath of 60° C. for 24 hours to obtain a polymer.

After the polymer had been dissolved in perfluorobenzene, the solution was poured in a large amount of methanol to obtain precipitates, which were then reprecipitated in a similar system to obtain precipitates. The precipitates were recovered and dried under vacuum to obtain a pentafluorostyrene polymer in an amount of 38 g (or in a 95% yield).

This polymer was found to have a glass transition temperature of 108° C., as measured by thermal analysis and a weight-average molecular weight of 250,000 calculated as polystyrene, as determined by GPC.

Two (2) g of this pentafluorostyrene polymer were dissolved in 48 g of perfluorobenzene, and the solution was spin-coated on an ITO electrode layer (with a resistance value of 80Ω/sq.) formed on a glass substrate (at 1000 rpm for 20 seconds), followed by 3-hour air drying. Afterwards, the product was heated at 80° C., 100° C., 130° C. and 150° C. for 1 hour to obtain 4 electrostatic information-recording media.

After heating, these recording media had all a thickness of 3 μm.

The thus obtained media were measured for their glass transition temperatures, while the pentafluorostyrene polymer films were released therefrom. As a result, the glass transition temperatures were found to be 98° C. for the medium heated at 80° C.; 99° C. for the medium heated at 100° C.; 104° C. for the medium heated at 130° C.; and 108° C. for the medium heated at 150° C.

Then, each of these recording media was charged on the charge-retaining layer to a surface potential of ±120 V with the use of a corona charger to determine the capability to retain charges.

The following table sets out the results of measurement of the surface potentials of the electrostatic information-recording media heated at varied temperatures, which had been all allowed to stand at normal temperature and humidity for 30 days.

| Heating Temperature (°C.) | Residual Potential (V) |
|---|---|
| 80 | ±60 |
| 100 | ±70 |
| 130 | ±90 |
| 150 | ±100 |

It can be understood from this table that the higher the heating temperature, the better the residual potential, whether + or −.

Then, the recording media heated at varied temperatures were subjected to accelerated testing at 60° C. and 25% R.H. for 30 days. The surface potentials measured are reported below.

| Heating Temperature (°C.) | Residual Potential (V) |
|---|---|
| 80 | ±30 |
| 100 | ±40 |
| 130 | ±50 |
| 150 | ±75 |

Further, the recording media heated at varied temperatures were subjected to accelerated testing under high humidity conditions of 95% R.H. at 40° C. over a period of 30 days. The surface potentials found are set out below.

| Heating Temperature (°C.) | Residual Potential (V) |
|---|---|
| 80 | ±30 |
| 100 | ±30 | polypentafluorostyrene layer on a fluoropolymer layer is superior in the capability to carry charges under high temperature conditions to a medium consisting only of either a fluoro-polymer layer (○) or a polypentafluorostyrene layer (●).

EXAMPLE 10

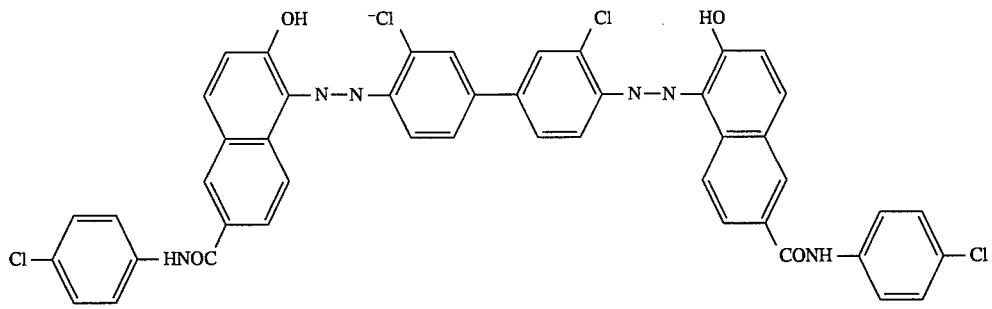

-continued

| Heating Temperature (°C.) | Residual Potential (V) |
|---|---|
| 130 | ±70 |
| 150 | ±75 |

EXAMPLE 9

An ITO electrode layer was deposited on a 1-mm thick glass substrate at a thickness of 1000 angstroms by vacuum vapor deposition ($10^{-5}$ Torr). Coated on this electrode was a 7% by weight solution of a fluorine-containing resin ("Cytop" made by Asahi glass Co., Ltd. and having a water absorption of 0.01% and a specific resistance value of $1 \times 10^{18}$ Ω.cm) dissolved in perfluoro(2-butyltetrahydrofuran) by a blade coater, followed by 3-hour air drying. After that, the product was heated at 150° C. for 1 hour for the lamination of a fluoropolymer layer of about 2 μm in thickness.

Coated on the fluoropolymer layer was a 4% by weight solution of polypentafluorostyrene in 1,3-ditrifluoromethylbenzene by spin coating (at 2000 rpm for 20 seconds), followed by 3-hour air drying. After that, the product was heated at 150° C. for 1 hour to prepare an electrostatic information-recording medium having a charge-retaining layer at a total thickness of 3 82 m.

The thus obtained recording medium was charged thereon to a surface potential of ±120 V by a corona charger.

After this electrostatic information-recording medium had been allowed to stand at normal temperature and humidity for 30 days, the surface potential was found to be maintained at ±115 V. Even after allowed to stand at 60° C. and 25% R.H. over a period of 30 days, the surface potential was found to be kept at +90 V, and even after allowed to stand under high humidity conditions of 95% R.H. at 40° C. over a period of 30 days, the surface potential was found to be held at +113 V.

Figure 8:
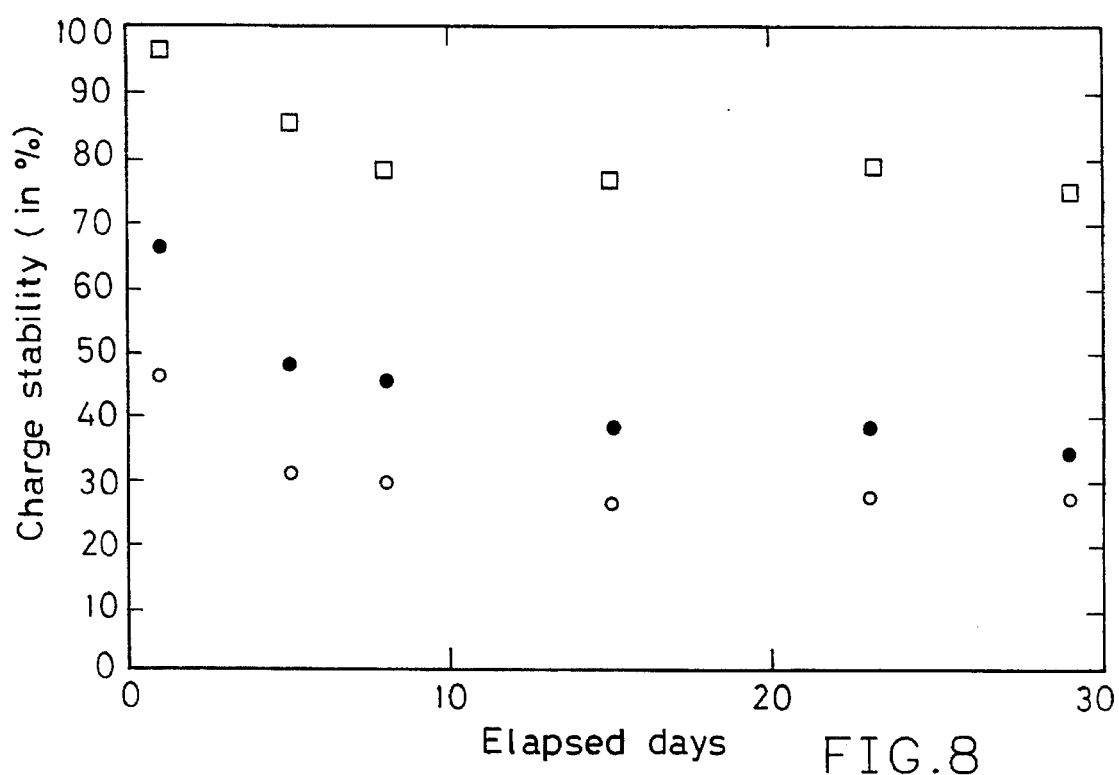
FIG. 8 is a graphic view for illustrating the capability of an electrostatic information-recording medium, prepared in Ex. 2, to carry charges.

It is noted that in FIG. 8, there is shown how the stability of plus charges retained in the electrostatic information-recording medium changed with the lapse of time, while it was held at 60° C. and 25% R.H.

As can be appreciated from this diagram, the electrostatic information-recording medium (□) formed by laminating a A 100-g solution—having a solid content of 2%—of 3 parts of a bis-azo type of pigment having the above-mentioned structural formula and 1 part of polyvinyl acetal resin—both serving as charge-generating materials—dissolved in a mixed solvent consisting of dioxane and cyclohexane at 1:1 was well dispersed in a ball mill to prepare a dispersion, which was then coated on the surface of an ITO transparent electrode layer (having a thickness of about 500 angstroms and a resistance value of 80Ω/□) formed on a glass substrate with the use of a 2-mil gap blade coater. Subsequent 1-hour drying at 100° c. gave a charge-generating layer of 0.3 μm in thickness.

Then, 15 parts of P-diethylaminobenzaldehyde-N-phenyl-benzylhydrazone and 10 parts of a polycarbonate resin ("Yupiron S-100" made by Mitsubishi gas Chemical Co., Ltd.)—both serving as charge-transporting materials—were used with a mixed solvent consisting of dichloromethane and 1,1,2-trichloroethane at 4:6 to prepare a solution having a solid content of 17.8%, which was in turn coated on the above-mentioned charge-generating layer with the use of a 2-mil gap blade coater. Subsequent 2-hour drying at 80° C. gave a charge-transporting layer of 10 μm in thickness, thereby preparing an organic photosensitive member.

While the surface of the electrostatic information-recording medium prepared in Ex. 9 was located in opposition to the surface of the photoconductive layer of the above-mentioned photosensitive member using a 10-μm thick polyester film as a spacer, both the photosensitive member and the recording medium were setted. Then, a D.C. voltage of 750 V was applied between both the electrodes with the photosensitive member and the resin layers kept positive and negative, respectively.

With the voltage applied, the electrostatic information-recording medium was exposed through the photosensitive member to light emanating from a halogen lamp light source at a luminous intensity of 1000 luxes for 0.1 second, thereby forming an electrostatic latent image on the recording medium.

Then, a potential difference between the electrode and the surface of the recording medium was measured with a surface potentiometer shown in FIG. 5 ("Treck Model 344). As a result, the recording medium was found to have a surface potential of +100 V, but the unexposed region was found to have a surface potential of 0 V.

In the description that follows, the 3rd electrostatic information-recording medium according to this invention and how to record and reproduce electrostatic information with this recording medium will be explained in greater detail.

FIG. 9 is a diagrammatic sketch showing one embodiment of this electrostatic information-recording medium, and FIGS. 10a–d are diagrammatic sketches for illustrating how to record information in the electrostatic information-recording medium. In these sketches, a support is shown at 41 or 46, an electrode at 42 or 45, a charge-retaining layer at 43, a photoconductive layer at 44, a release layer at 47 and a power source at 48.

Now assume that this electrostatic information-recording medium is designed to be exposed to light through the support 46, as shown in FIG. 9. Then, an about 1000-angstrom thick, transparent ITO (indium oxide-tin oxide) electrode 45 is formed on a glass support 46 having a thickness of, say, about 1 mm, and is in turn provided thereon with a photoconductive layer 4 and a charge-retaining layer, each of about 10 μm in thickness, an Al electrode 42 of about 1000 angstroms in thickness and a glass support 41 of about 1 mm in thickness in that order. Upon incidence of light, the photoconductive layer 44, which behaves as a high resistor in the dark, is made electrically conductive at a portion upon which the light impinges. Consequently, when the photoconductive layer 44 is exposed to light while voltage is applied between the electrodes 42 and 45 ("exposure with the application of voltage"), one of light carriers generated in the photoconductor 44 migrates toward the charge-retaining layer 43. The electrode 42, which is releasable in this embodiment, is released from the charge-retaining layer 43 after "image exposure" has been carried out with voltage applied between the electrodes 42 and 45 to form an electrostatic latent image, thereby storing the electrostatic latent image.

In other words, this embodiment is designed such that the electrode 42 is released from the charge-retaining layer 43 with a release layer 47 apparently defined between them, whereby the charges built up on the electrode 42 are allowed to remain on the charge-retaining layer 43 through "release discharge" taking place between it and the electrode 42, thereby accumulating the charges on the surface of the charge-retaining layer 43 and storing the resulting electrostatic latent image.

Reference will be made to how to record information in the above-mentioned electrostatic information-recording medium.

Figure 10A:
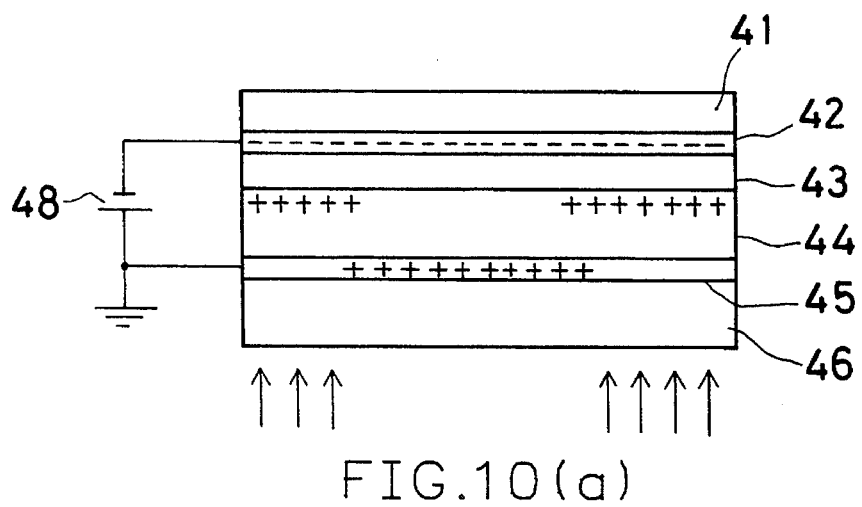
FIGS. 10a–d are diagrammatic sketches illustrating how to record electrostatic information on the 3rd electrostatic information-recording medium according to this invention.

In order to record information in the electrostatic information-recording medium shown in FIG. 9, the power source 48 is first connected between the electrodes 42 and 45 to apply voltage therebetween for the image exposure, as illustrated in FIG. 10a. In consequence, the photoconductive layer 44 is exposed to light through the electrode 45 located on the side of the layer 44 to generate light carriers, and while attracted by the electrode 42 located on the side of the charge-retaining layer 43, charges opposite in polarity to the electrode 42 pass through the photoconductive layer 44. Then, the charges reach the surface of the charge-retaining layer 43 where they stop and are built up.

Figure 10B:
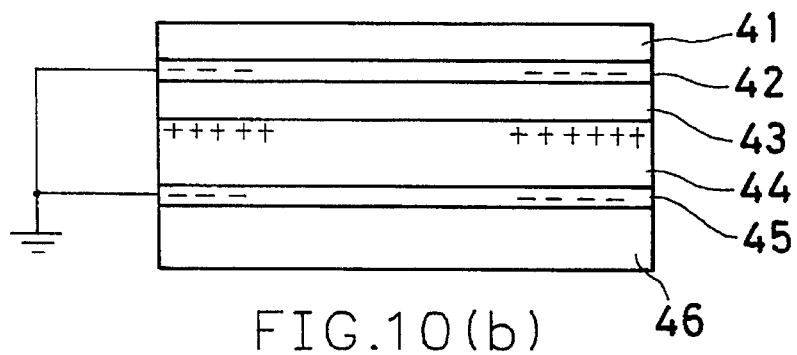

After the completion of exposure, the electrodes 42 and 45 are short-circuited and grounded, as shown in FIG. 10b, thereby leaving on the electrodes 42 and 45 only charges corresponding to the charges accumulated on the surface of the charge-retaining layer 43.

Figure 10C:
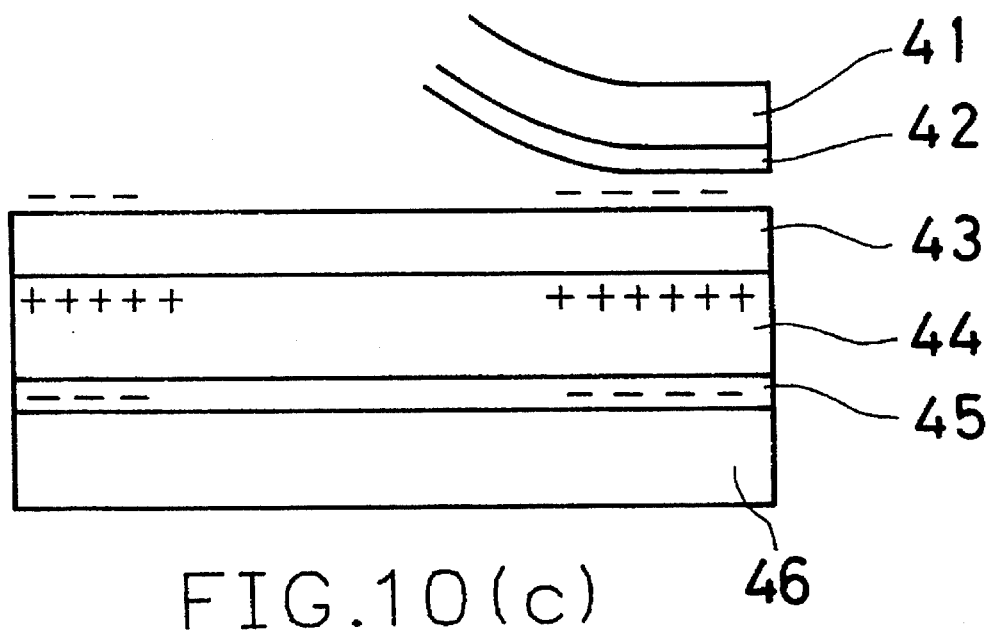

Next, the electrode 42 is released from the charge-retaining layer 43, as shown in FIG. 10c, during which the release discharge takes place between the electrode 42 and the charge-retaining layer 43, causing the charges accumulated on the electrode 42 to remain on the surface of the charge-retaining layer 43.

Figure 10D:
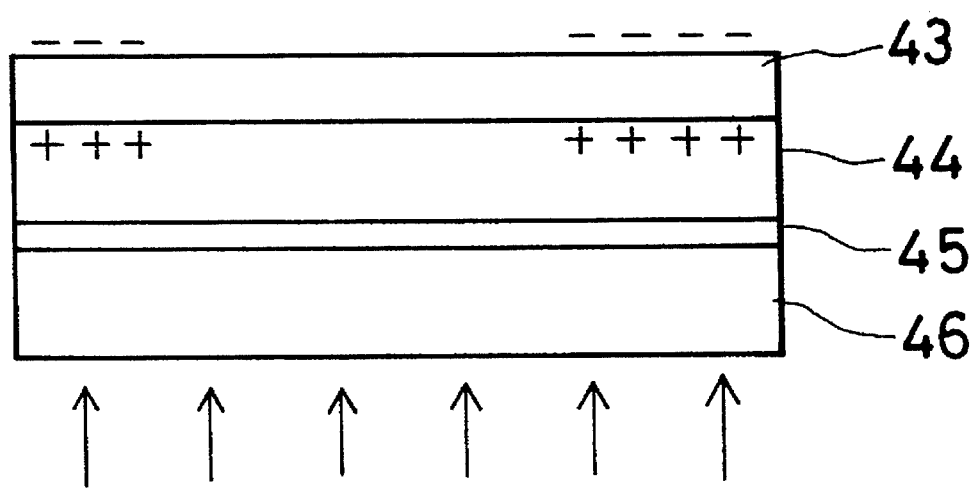

Finally, the recording medium is uniformly exposed to light, as shown in FIG. 10d, to cancel a part of the charges accumulated between the charge-retaining layer 43 and the photoconductive layer 44 with light carriers formed in the photoconductive layer, causing the charges to accumulate on only both surfaces of the charge-retaining layer 43.

It is noted that the procedures of FIGS. 10d and 10c may be reversed in order; the electrode 42 may be released from the charge-retaining layer 43 after uniform exposure.

The above-mentioned process for recording information with the 3rd electrostatic information-recording medium according to this invention is of the surface charge-retaining type in which the charge-retaining and photoconductive layers 43 and 44, provided between the electrodes 42 and 45 in a laminated form, is exposed to light with the application of voltage but without recourse to discharge through an air gap, thereby forming an electrostatic latent image. Thus, it is possible to make a high-sensitive recording of information even by the exposure with the application of a voltage as low as about 100 V to 300 V. Accordingly, records can be stably stored with no degradation of resolution due to an air layer.

When this recording process is used for the purpose of planar analog recording, the resulting resolution is as high as that achieved with silver photography. Although the surface charges formed on the charge-retaining layer 43 are exposed to atmospheric environment, they can be stored over an extended period with no discharge, whether in a bright or dark place, because air behaves as a good insulator.

How long the charges on the charge-retaining, layer 43 is stored is determined by the properties of an insulator, and is affected by how well the insulator is capable to pick up charges, in addition to the insulating properties of air. Although described as surface charges, the injected charges penetrate microscopically through the insulator from its surface to trap electrons or holes in the structure of that material, so that they can be stored over an extended period. In order to prevent the charge-retaining medium from being physically damaged or from discharging in an atmosphere of high humidity, the charge-retaining layer 3 may be covered on the surface with an insulating film, etc.

The charge-retaining layer 43, which is formed of a highly insulating polymeric material so as to suppress migration of charges, is required to have an insulating property of $10^{14}$ Ω.cm or more as expressed in terms of specific resistance. The polymeric material forming the charge-carrying layer should have a glass transition temperature higher than the temperature of environment in which it is used. In normal environment in which it is used, the polymeric material is desired to have a glass transition temperature of 20° C. to 100° C. or higher.

The polymeric materials used, for instance, may include such thermosetting resins as phenolic resin, furan resin, xylene-formaldehyde resin, ketone-formaldehyde resin, urea resin, melamine resin, aniline resin, alkyd resin, unsaturated polyester resin, epoxy resin, triacyl isocyanurate resin, formaldehyde resin of tris(2-hydroxyethyl)isocyanurate resin, acrolein resin, phosphonitrile dihalide type polymeric derivatives, curing maleimide resin, thermosetting cyclopentadiene resin, products obtained by the crosslinking reaction of cyclic urea resin and triazine resin; such thermoplastic resins as polyethylene, ethylene-vinyl acetate copolymers, ethylene/ethyl acrylate-ethylene/methyl acrylate copolymers, polypropylene, polybutylene, methylpentene resin, polystyrene, poly-para-xylenes, polyvinyl acetate, polyacrylate, polymethacrylate, vinyl chloride resin, polyvinylidene chloride resin, fluoropolymers, polyacrylonitrile, polyvinyl ether, polyvinyl ketone, polyether, polycarbonate, thermoplastic polyester, polyamide, diene plastics, polyurethane plastics, petroleum resin, rosin derivatives and terpene resin; such polymers as aromatic polyamide, polyphenylene, polyxylylene, polyphenylene oxide, polysulfone and aromatic heterocyclic polymers; silicone and inorganic types of plastics; and naturally occurring rubber, cellulose, protein and starch types of plastics. Thus, the resins having an insulation resistance value of $10^{14}$ Ω.cm or more may be used.

Preferable as the fluoropolymers are, by way of example alone, polytetrafluoroethylene, fluorinated ethylene propylene, tetrafluoroethylene-perfluoroalkyl vinyl ether copolymers, polyether ether ketone resin and poly-para-xylenes.

In order to form the charge-carrying layer, the above-mentioned resin may be provided on the electrode by suitable means such as coating, dipping, vapor deposition and sputtering. Alternatively, a film formed of the above-mentioned resin may be applied onto the electrode through an adhesive, etc. For the same purpose, an electrode layer may be formed on one side of that film by suitable means such as vapor deposition, sputtering and coating. In this case, an additional layer may be provided to protect the electrode layer. Further, when some mechanical strength is needed, a film or like material of higher mechanical strength may be laminated on that additional layer.

The electrostatic information-recording medium, which is designed to record information on the charge-carrying layer in the form of a distribution of electrostatic charges, may take various forms depending upon what type of information is to be recorded or how to record information. For instance, when used with an electrostatic camera (co-pending Japanese Patent Application No.63 (1988)-121591 specification), the recording medium may be in the form of a general film (for single or continuous frames) or disc. Also, when used to record digital or analog information with laser, the recording medium may be in the form of a tape, disc or card.

No particular limitation is imposed on the material and thickness of the supports for the electrostatic information-recording medium and photosensitive member, provided that they have enough strength to support them. For instance, use may be made of flexible plastic films, metal foils, paper, glass, plastic sheets or rigid materials such as metal sheets (which may also serve as electrodes). However, when the supports are used for systems for recording information with light incident through the photosensitive member, it is essentially required to transmit that light. For the supports employed with a camera using natural light incident through the photosensitive member, use may be made of transparent sheet or plastic film or sheet, all having a thickness of about 1 mm.

No particular limitation is placed on the material of the electrodes, provided that they have a specific resistance value of $10^6$ Ω.cm or less. For instance, they may be electrically conductive films of inorganic metals or their oxides. Such electrodes may be provided on substrates (supports) by suitable means such as vapor deposition, sputtering, CVD, coating, plating, dipping or electrolytic polymerization, but their thickness is required to vary depending upon the electrical characteristics of the material forming them and the voltage applied for recording information. For instance, aluminium electrodes may have a thickness of about 100 to 3000 angstroms. The electrodes must have given optical characteristics, when it is required to receive information light, as is the case with the support for the photoconductive layer.

It is noted that when the electrode is required to be transparent to light, an anti-reflection layer may be provided thereon and/or the thickness of the electrode layer or the photoconductive layer may be adjusted, thereby achieving the desired anti-reflection effect.

Reference will now be made to how to input information to the electrostatic information-recording medium. This may be achieved with an electrostatic camera of high resolution laser. Referring first to the electrostatic camera of high resolution a recording member constructed from the electrostatic information-recording medium is used in place of a photographic film. Then, voltage is applied to both electrodes to make the photoconductive layer electrically conductive depending upon the quantity of incident light, thereby forming an electrostatic latent image on the charge-retaining layer depending upon the quantity of the incident light. The shutter used may be of either the mechanical or the electrical type. That electrostatic latent image can be stored over an extended period, whether in a bright or dark place.

A color filter may also be used to separate optical information into R, G and B components through a prism and extract them as parallel beams. For color photographing, one frame may then be formed either by three sets of electrostatic information-recording media separated into the R, G and B colors or by a set of R, G and B images arranged on one plane.

For laser recording systems, argon laser (514.488 nm), helium-neon laser (633 nm) or semiconductor laser (780 nm, 810 nm) may be used as the light source. Voltage is then applied, while the photosensitive member is brought in close, planar contact with or in opposition to the electrostatic information-recording medium at a constant interval. In this case, the electrode may be of the same polarity as that of the carrier of the photosensitive member. In that state, laser exposure corresponding to picture image, character, cord or line signals is carried out by scanning. Analog recording of information such as picture images is made by the modulation of the intensity of laser light, while digital recording of characters, cords or line pictures is done by the on-off control of laser light. Dotted imaging may also be carried out under the dot generator on-off control of laser light. It is noted that the spectral properties of the photoconductive layer in the photosensitive member need not be panchromatic, and may be well sensitive to the wavelength of the laser light source.

Reference will now be made to the 4th electrostatic information-recording medium and how to record and reproduce information with this recording medium.

Figure 11:
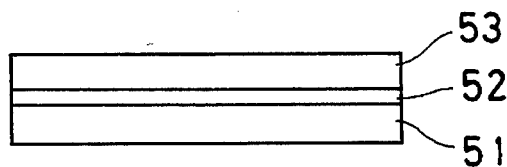
FIG. 11 is a diagrammatic sketch showing one embodiment of the 4th electrostatic information-recording medium according to this invention.

FIG. 11 is a diagrammatic sketch showing one embodiment of this electrostatic information-recording medium, wherein a charge transport layer is shown at 51, an electrode at 52 and a support 53.

As illustrated in FIG. 11, the 4th electrostatic information-recording medium according to this invention, for instance, includes a support of about 1 mm in thickness, an about 1000-angstrom thick electrode 52 formed thereon by vapor deposition and a 10-μm. thick charge transport layer 51 formed on that electrode. The charge transport layer 51 allows migration of the charges contained therein, but is otherwise insulated.

The charge transport layer 51 is constructed from a charge transport material and a binder. As the charge transport material to this end, use may be made of an organic charge transport material, e.g. a hole transport material.

For instance, the electrode 52 and support 53 are formed of ITO (indium oxide-tin oxide) and a polyester film, respectively. If required, the electrode 52 may be provided thereon a blocking layer having a thickness of about 1000 angstroms, which prevents injection of charges from the electrode and injects holes from the bulk through the tunnel effect.

In the case of the electrostatic information-recording medium of the above-mentioned structure, the surface of the charge transport layer 51 is toner-developed, heated and fixed after an electrostatic latent image, for instance, has been formed thereon. If the toner used is of the type that comprises an insulating binder kneaded with an electrically conductive material such as carbon, it is then possible to deposit the toner onto the surface of the charge transport layer 51 to make it blocking-free. For this reason, corona charging of the surface of the charge transport layer 51—which has been toner-developed—causes the resulting charges to be injected into the charge transport layer 51 through the electrically conductive particles contained in the toner, giving an electrostatic latent image.

In other words, the toner has insulating properties in itself, but can be made electrically conductive with an electrically conductive material such as carbon dispersed in it, because the carbon particles are brought in contact with each other when the toner is fixed. Thus, even an image, which carries a slight amount of the toner and is nearly invisible, can give an electrostatic latent image with a greatly decreased potential by corona electrical charging, because the charges can then be injected into a region corresponding to the toner image. Accordingly, it is possible to reproduce the image by toner development or reading a potential change for CRT display after such corona electrical charging. For that reason, the toner may provide a minimum covering to the region to be unexposed, so that gray-scale representation can be well achieved even with an amount of toner development that is all but invisible to the naked eye.

After the latent image has been formed on the surface of the charge transport layer 51 by the image exposure, toner development is carried out by reversal development making use of a wet type of toner. In order to record the exposed image, the toner may then be heated and fixed. In this case, even though this image carries a slight amount of the toner and is nearly invisible, it can be reproduced by carrying out corona electrical charging as mentioned above for image development.

With the electrostatic information-recording medium according to this invention, it is thus possible to record and store an electric latent image as such by toner development, even though it is formed on the surface of the charge transport layer 51 by the image exposure with high sensitivity comparable to a camera's shutter speed. This latent image can also be easily reproduced by corona electrical charging. In other words, gray-scale representation is attainable even at a small amount of exposure with the achievement of high sensitivity.

How to record and reproduce information with this electrostatic information-recording medium will now be explained specifically but not exclusively with reference to FIGS. 12*a–d*, wherein a photosensitive member is shown at 61, an electrostatic information-recording medium at 63, an electrode at 64, a photoconductive layer at 65, a power source at 66, a corona electrical charger at 67, an electrode at 68 and a potential sensor at 69.

Referring to FIGS. 12*a–d*, the electrostatic information-recording medium 62 is the same as explained in connection with FIG. 11, and is exposed to light through the photosensitive member 61.

The photosensitive member 61, for instance, constructed from a support 63 formed of a 1-mm thick glass, a 1000-angstrom thick, transparent electrode 64 of ITO formed thereon, and a 10-μm thick photoconductive layer 65 formed on that electrode. The recording medium 62 is located with respect to this photosensitive member 61 through a gap of about 10 μm.

Figure 12A:
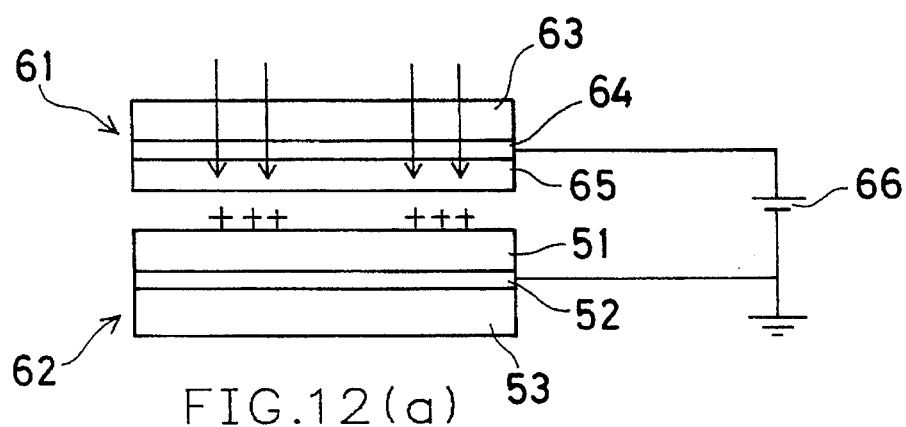
FIGS. 12a–d are diagrammatic sketches illustrating how to record and reproduce electrostatic information with the 4th electrostatic information-recording medium according to this invention.

When the power source 66 is connected between the electrodes 64 and 52 to apply voltage between them, as illustrated in FIG. 12*a*, the photoconductive layer 65, which behaves as a high resistor in the dark, is made electrically conductive at the region that is exposed to light incident through the photosensitive member 61. Thus, when the recording medium 62 is exposed to information-carrying light through the photosensitive member 61 with the application of voltage, discharge takes place between the photoconductive layer 65 and the charge transport layer 51, causing charges corresponding to the information to be recorded to accumulate on the surface of the charge transport layer 51. After the completion of exposure, the power source 66 is put off to remove the recording medium 62, whereby the formation of an electrostatic latent image is completed.

It is noted that the photosensitive member 61 may be brought in no contact (as mentioned above) or contact with the electrostatic information-recording medium 62. In the contact arrangement, positive or negative charges are injected from the electrode 64 of the photosensitive member into the region of the photoconductive layer 65 to exposed to light. While attracted by the electrode 52 of the recording medium 62, the charges pass through the photoconductive layer 65 and reach the surface of the charge transport layer 51 where they stop for accumulation. Then, as the recording medium 62 is separated from the photosensitive member 61, the charge transport layer 51 is separated from the material 61 with the charges remaining accumulated thereon.

According to this recording process, it is possible to form an electrostatic latent image by high-sensitive exposure, as already mentioned. In addition, when this recording process is used for the purpose of planar analog recording, the resulting resolution is as high as that achieved with silver photography. Although the surface charges formed on the charge transport layer 51 are exposed to atmospheric environment, they can be stored over an extended period with no discharge, whether in a bright or dark place, because air behaves as a good insulator.

Figure 12B:
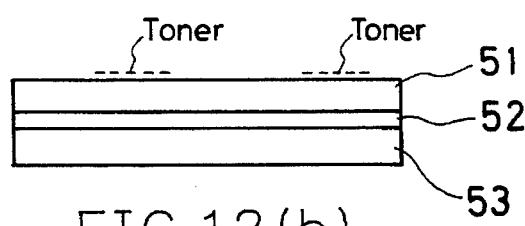

How long the charges on the charge transport layer 51 is stored is determined by the properties of an insulator, and is affected by how well the insulator is capable to pick up charges, in addition to the insulating properties of air. As illustrated in FIG. 12*b*, however, if the charge imaged is converted into a toner image by toner development, heating and fixation, it can then be stored over a more extended period.

Figure 12C:
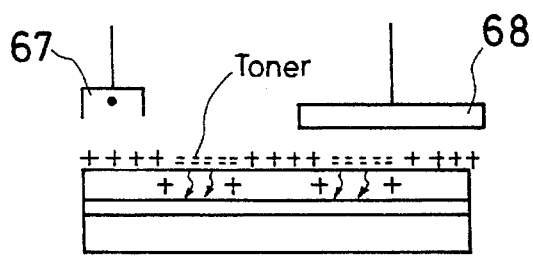
Figure 12D:
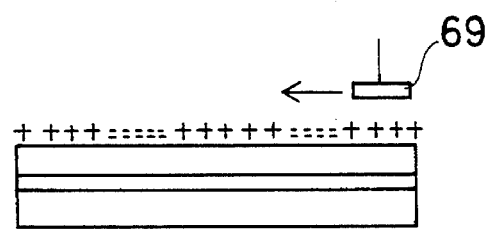

For reading, the toner is electrified, using "air discharge" induced by corona charging or the application of voltage to an electrode 68, as illustrated in FIG. 12*c*. Then, the resulting charges forms a negative type of electrostatic latent image on the recording medium, because the + charges formed on the toner is injected through the electrically conductive material of the toner into the charge transport layer 51. The surface of the charge transport layer 51 is in turn scanned with a suitable sensor 69 to read a potential formed by electrostatic charges or read an electric field defined by electrostatic charges in an electrooptical manner, thereby reading the electrostatic latent image electrically. This latent image can further be developed by toner development, as already mentioned.

Reference will now be made to what forms the photosensitive member and electrostatic information-recording medium.

No particular limitation is imposed on the material and thickness of the supports for the electrostatic information-recording medium and photosensitive member, provided that they have strength sufficient to support them. For instance, use may be made of flexible plastic films, metal foils, paper, glass, plastic sheets or rigid materials such as metal sheets (which may also serve as electrodes). However, when the supports are used for systems for recording information with light incident through the photosensitive member, it is essentially required to transmit that light. For the supports employed with a camera using natural light incident from the photosensitive member, use may be made of transparent sheet or plastic film or sheet, all having a thickness of about 1 mm.

No particular limitation is placed on the material of the electrodes, provided that they have a specific resistance value of $10^6$ $\Omega$.cm or less. For instance, they may be electrically conductive films of inorganic metals or their oxides. Such electrodes may be provided on substrates (supports) by suitable means such as vapor deposition, sputtering, CVD, coating, plating, dipping or electrolytic polymerization, but their thickness is required to vary depending upon the electrical characteristics of the material forming them and the voltage applied for recording information. For instance, aluminium electrodes may have a thickness of about 100 to 3000 angstroms. The electrodes must have given optical characteristics, when it is required to receive information light as is the case with the support for the photoconductive layer.

For instance, if the information light visible light (400 to 700 nm), use may then made of transparent electrodes obtained by vapor deposition or sputtering of, e.g. ITO ($In_2O_3$—$SnO_2$) or $SnO_2$ or coating of finely divided powders thereof formed with a binder into ink, semi-transparent electrodes obtained by vapor deposition or sputtering of, e.g. Au, Al, Ag, Ni or Cr, or organic electrodes obtained by coating of, e.g. tetracyanoquino-dimethane (TCNQ) or polyacetylene.

The above-mentioned electrode materials may also be used in the case where the information light is infrared light (700 nm or more). In some cases, colored electrodes capable of absorbing visible light may be used so as to cut off visible light.

Basically, the above-mentioned electrode material may also be used in the case where the information light is ultraviolet light (400 nm or below). However, electrode substrate materials which absorb ultraviolet light—for instance, organic polymer materials and soda glass—are unpreferred. Thus, preferable are materials such as quartz glass, which can transmit ultraviolet light.

The charge transport layer may be formed of organic materials capable of transporting charges—for instance, hyrazones, pyrazolines, PVKs, carbazoles, oxadiazoles, triazoles, aromatic amines, amines, triphenylmethanes and polycyclic aromatic compounds. It is noted that in order to increase the span of time from exposure to toner development, the binder used may be an insulating material well capable of carrying charges.

The photoconductive layer is an electrically conductive layer which, upon irradiated with light, generates light carriers (electrons, positive holes) at the irradiated region, and allows widthwise migration of such carriers. This effect is enough good so esp., in the presence of an electric field. Such a layer may be formed of an inorganic or organic photoconductive material or their hybrid.

While the present invention has been described specifically with reference to some embodiments, the invention is not limited thereto and various modifications are possible within the scope of the invention. For instance, while the power source has been described as connected to the photoconductive materials kept positive and the electrostatic information-recording material kept negative, this connection may be reversed in polarity. Also, while described as carried out from the photosensitive member, exposure may be carried out from the opposite side.

The 4th electrostatic information-recording medium according to this invention, which is designed to record information on the charge transport layer in the form of a distribution of electrostatic charges and to store it by toner development, may take various forms depending upon what type of information is to be recorded or how to record information. For instance, when used with an electrostatic camera (co-pending Japanese Patent Application No.63 (1988)- 121591 specification), the recording medium may be in the form of a general film (for single or continuous frames) or disc. Also, when used to record digital or analog information with laser, the recording medium may be in the form of a tape, disc or card.

No particular limitation is imposed on the material and thickness of the supports for the electrostatic information-recording medium and photosensitive member, provided that they have enough strength to support them. For instance, use may be made of flexible plastic films, metal foils, paper, glass, plastic sheets or rigid materials such as metal sheets (which may also serve as electrodes). However, when the supports are used for systems for recording information with light incident through the photosensitive member, it is essentially required to transmit that light. For the supports employed with a camera using natural light incident through the photosensitive member, use may be made of transparent sheet or plastic film or sheet, all having a thickness of about 1 mm.

No particular limitation is placed on the material of the electrodes, provided that they have a specific resistance value of $10^6$ $\Omega$.cm or less. For instance, they may be electrically conductive films of inorganic metals or their oxides. Such electrodes may be provided on substrates (supports) by suitable means such as vapor deposition, sputtering, CVD, coating, plating, dipping or electrolytic polymerization, but their thickness is required to vary depending upon the electrical characteristics of the material forming them and the voltage applied for recording information. For instance, aluminium electrodes may have a thickness of about 100 to 3000 angstroms. The electrodes must have given optical characteristics, when it is required to receive information light, as is the case with the support for the photoconductive layer.

It is noted that when the electrode is required to be transparent to light, an anti-reflection layer may be provided thereon and/or the thickness of the electrode layer or the photoconductive layer may be adjusted, thereby achieving the desired anti-reflection effect.

Reference will now be made to how to input information to the electrostatic information-recording medium. This may be achieved with an electrostatic camera of high resolving power or laser. Referring first to the electrostatic camera of high resolving power, a recording member constructed from the electrostatic information-recording medium is used in place of a photographic film. Then, voltage is applied to both electrodes to make the photoconductive layer electrically conductive depending upon the quantity of incident light, thereby forming an electrostatic latent image on the charge-retaining layer depending upon the quantity of the incident light. The shutter used may be of either the mechanical or the electrical type. That electrostatic latent image can be stored over an extended period, whether in a bright or dark place.

A color filter may also be used to separate optical information into R, G and B components through a prism and extract them as parallel beams. For color photographing, one frame may then be formed either by three sets of electrostatic information-recording media separated into the R, G and B colors or by a set of R, G and B images arranged on one plane.

For laser recording systems, argon laser (514.488 nm), helium-neon laser (633 nm) or semiconductor laser (780 nm, 810 nm) may be used as the light source. Voltage is then applied, while the photosensitive member is brought in close, planar contact with or in opposition to the electrostatic information-recording medium at a constant interval. In this case, the electrode may be of the same polarity as that of the carrier of the photosensitive member. In that state, laser exposure corresponding to picture image, character, cord or line signals is carried out by scanning. Analog recording of information such as picture images is made by the modulation of the intensity of laser light, while digital recording of characters, cords or line pictures is done by the on-off control of laser light. Dotted imaging may also be carried out under the dot generator on-off control of laser light. It is noted that the spectral properties of the photoconductive layer in the photosensitive member need not be panchromatic, and may be well sensitive to the wavelength of the laser light source.

INDUSTRIAL APPLICABILITY

The electrostatic information-recording media and processes for recording and reproducing electrostatic information according to this invention are applicable to fields relating to electrostatic information recording.

What is claimed is:

1. A process for recording and reproducing electrostatic information, characterized by:

providing an electrostatic information-recording medium including a photoconductive layer and a charge-retaining layer laminated between a pair of electrodes in releasable relation to at least one electrode of said pair of electrodes, exposing said recording medium to light with the application of voltage between said both electrodes or applying voltage between both said electrodes while said recording medium is exposed to light, thereby forming an electrostatic latent image, grounding both said electrodes, releasing the associated electrodes from said charge-retaining layer to allow the charges on said associated electrode to remain on said charge-retaining layer by release discharge, and subjecting said recording medium to uniform exposure to carry said latent image on the surface of said charge-retaining layer.

2. A process for recording and reproducing electrostatic information, characterized in that a photoconductive layer, a charge retaining layer and a first electrode layer are sequentially laminated on a second electrode layer to make up an electrostatic information recording medium, the first electrode layer laminated on said charge retaining layer is designed as a detachable electrode layer or the first electrode layer is laminated on said charge retaining layer via a detachable layer, said electrostatic information recording medium is exposed to light with voltage applied between the two electrodes or voltage is applied between the two electrodes while the medium is exposed to light, thereby forming an electrostatic latent image, the two electrodes are grounded, and the electrode layer laminated on said charge retaining layer is detached and removed.

3. A process for recording and reproducing electrostatic information, characterized in that a photoconductive layer, a charge retaining layer and a first electrode layer are sequentially laminated on a second electrode layer to make up an electrostatic information recording medium, the first electrode layer laminated on said charge retaining layer is designed as a detachable electrode layer or the first electrode layer is laminated on said charge retaining layer via a detachable layer, said electrostatic information recording medium is exposed to light with voltage applied between the two electrodes or voltage is applied between the two electrodes while the medium is exposed to light, thereby forming an electrostatic latent image, the two electrodes are grounded, the electrode layer laminated on said charge retaining layer is detached and removed, and uniform blanket exposure is performed.

4. A process for recording and reproducing electrostatic information, characterized in that a photoconductive layer, a charge retaining layer and a first electrode layer are sequentially laminated on a second electrode layer to make up an electrostatic information recording medium, the first electrode layer laminated on said charge retaining layer is designed as a detachable electrode layer or the first electrode layer is laminated on said charge retaining layer via a detachable layer, said electrostatic information recording medium is exposed to light with voltage applied between the two electrodes or voltage is applied between the two electrodes while the medium is exposed to light, thereby forming an electrostatic latent image, uniform blanket exposure is then performed, the two electrodes are grounded and the first electrode layer laminated on said charge retaining layer is detached and removed.

* * * * *